United States Patent
Zholudev et al.

(10) Patent No.: US 10,942,981 B2
(45) Date of Patent: *Mar. 9, 2021

(54) ONLINE PUBLICATION SYSTEM AND METHOD

(71) Applicant: ResearchGate GmbH, Berlin (DE)

(72) Inventors: Vyacheslav Zholudev, Berlin (DE); Peter Magenheimer, Berlin (DE); Mark Howard-Banks, Berlin (DE); Axel Tölke, Berlin (DE); Daniel Tschinder, Berlin (DE); Stephen Mansfield, Berlin (DE)

(73) Assignee: ResearchGate GmbH, Berlin (DE)

( * ) Notice: Subject to any disclaimer, the term of this patent is extended or adjusted under 35 U.S.C. 154(b) by 291 days.

This patent is subject to a terminal disclaimer.

(21) Appl. No.: 15/958,856

(22) Filed: Apr. 20, 2018

(65) Prior Publication Data
US 2018/0239833 A1    Aug. 23, 2018

Related U.S. Application Data

(63) Continuation of application No. 15/040,127, filed on Feb. 10, 2016, now Pat. No. 9,996,629.
(Continued)

(51) Int. Cl.
*G06F 16/00* (2019.01)
*G06F 16/955* (2019.01)
(Continued)

(52) U.S. Cl.
CPC .......... *G06F 16/955* (2019.01); *G06F 3/0482* (2013.01); *G06F 3/04842* (2013.01); *G06F 16/1794* (2019.01); *G06F 16/22* (2019.01); *G06F 16/2255* (2019.01); *G06F 16/245* (2019.01); *G06F 16/248* (2019.01); *G06F 16/93* (2019.01); *G06F 16/9535* (2019.01); *G06F 40/117* (2020.01); *G06F 40/123* (2020.01); *G06F 40/14* (2020.01); *G06F 40/166* (2020.01); *G06F 40/169* (2020.01);
(Continued)

(58) Field of Classification Search
CPC ............... G06Q 30/02; G06Q 30/0254; G06Q 30/0277; G06Q 30/0623; G06Q 30/0641; G06Q 30/08; G06Q 30/0241; G06Q 30/0601; G06Q 40/04; G06Q 90/00; G06Q 10/087; G06Q 10/10; G06Q 30/0261

See application file for complete search history.

(56) References Cited

U.S. PATENT DOCUMENTS 5,708,828 A    1/1998    Coleman
5,806,078 A    9/1998    Hug et al.
(Continued)

OTHER PUBLICATIONS

"U.S. Appl. No. 15/040,109, Notice of Allowance dated Jun. 13, 2018", 12 pgs.
(Continued)

*Primary Examiner* — Yicun Wu
(74) *Attorney, Agent, or Firm* — Schwegman Lundberg & Woessner, P.A.

(57) ABSTRACT

Various systems and methods for creating, storing, structuring, displaying, enhancing, and/or referencing publications and related content in an online user network are described. In some embodiments, document contents are stored in the form of individually addressable document elements, which can be displayed selectively based on display criteria received from a user.

20 Claims, 16 Drawing Sheets

Related U.S. Application Data

(60) Provisional application No. 62/114,341, filed on Feb. 10, 2015.

(51) Int. Cl.

| | | |
|---|---|---|
| *G06F 3/0484* | (2013.01) |
| *G06F 16/22* | (2019.01) |
| *G06F 16/93* | (2019.01) |
| *G06F 16/245* | (2019.01) |
| *G06F 16/248* | (2019.01) |
| *G06F 16/178* | (2019.01) |
| *G06F 16/9535* | (2019.01) |
| *G06F 40/14* | (2020.01) |
| *G06F 40/20* | (2020.01) |
| *G06F 40/117* | (2020.01) |
| *G06F 40/123* | (2020.01) |
| *G06F 40/166* | (2020.01) |
| *G06F 40/169* | (2020.01) |
| *G06F 40/197* | (2020.01) |
| *G06F 40/205* | (2020.01) |
| *G06F 40/221* | (2020.01) |
| *G06F 3/0482* | (2013.01) |

(52) U.S. Cl.
CPC ............ *G06F 40/197* (2020.01); *G06F 40/20* (2020.01); *G06F 40/205* (2020.01); *G06F 40/221* (2020.01)

(56) References Cited

U.S. PATENT DOCUMENTS

| | | |
|---|---|---|
| 5,809,317 A | 9/1998 | Kogan et al. |
| 6,289,342 B1 | 9/2001 | Lawrence et al. |
| 6,963,959 B2 | 11/2005 | Hsu et al. |
| 7,010,742 B1 | 3/2006 | Hsu et al. |
| 7,386,792 B1 | 6/2008 | Bascom et al. |
| 8,203,952 B2 | 6/2012 | Borkovsky et al. |
| 8,379,053 B1 | 2/2013 | Phillips et al. |
| 8,386,912 B2 | 2/2013 | Story et al. |
| 8,418,054 B2 | 4/2013 | Ikegami |
| 8,478,662 B1 | 7/2013 | Snodgrass et al. |
| 8,577,754 B1 | 11/2013 | Chanda et al. |
| 8,930,392 B1 | 1/2015 | Leichter |
| 8,930,818 B2 | 1/2015 | Cordasco |
| 9,438,694 B1 | 9/2016 | Ochesel et al. |
| 9,626,000 B2 | 4/2017 | Kurzweil et al. |
| 9,715,482 B1 | 7/2017 | Bjorkegren |
| 9,753,922 B2 | 9/2017 | Haeusler et al. |
| 9,858,349 B2 | 1/2018 | Zholudev et al. |
| 9,916,365 B1 | 3/2018 | Dick et al. |
| 9,996,629 B2 | 6/2018 | Zholudev et al. |
| 10,009,308 B2 | 6/2018 | Brunn et al. |
| 10,102,298 B2 | 10/2018 | Madisch et al. |
| 10,282,424 B2 | 5/2019 | Zholudev et al. |
| 10,387,520 B2 | 8/2019 | Zholudev et al. |
| 10,558,712 B2 | 2/2020 | Zholudev et al. |
| 10,650,059 B2 | 5/2020 | Häusler et al. |
| 10,733,256 B2 | 8/2020 | Fickenscher et al. |
| 10,824,682 B2 | 11/2020 | Alvares et al. |
| 2001/0051897 A1 | 12/2001 | Loeb et al. |
| 2002/0065848 A1 | 5/2002 | Walker et al. |
| 2003/0163416 A1 | 8/2003 | Kitajima |
| 2004/0044958 A1 | 3/2004 | Wolf et al. |
| 2004/0088504 A1 | 5/2004 | Hsu et al. |
| 2004/0111677 A1 | 6/2004 | Luken et al. |
| 2004/0148571 A1 | 7/2004 | Lue |
| 2005/0028143 A1 | 2/2005 | Aridor |
| 2005/0060287 A1 | 3/2005 | Hellman et al. |
| 2005/0080815 A1 | 4/2005 | Inoue et al. |
| 2006/0053364 A1 | 3/2006 | Hollander et al. |
| 2006/0112146 A1 | 5/2006 | Song et al. |
| 2006/0143558 A1 | 6/2006 | Albornoz et al. |
| 2006/0150079 A1 | 7/2006 | Albornoz et al. |
| 2006/0248063 A1 | 11/2006 | Gordon |
| 2006/0287971 A1 | 12/2006 | Armstrong |
| 2007/0136243 A1 | 6/2007 | Schorn |
| 2007/0143794 A1 | 6/2007 | Negi |
| 2007/0244867 A1 | 10/2007 | Malandain et al. |
| 2007/0255698 A1 | 11/2007 | Kaminaga et al. |
| 2008/0071803 A1 | 3/2008 | Boucher |
| 2008/0086680 A1 | 4/2008 | Beckman |
| 2008/0155390 A1 | 6/2008 | Karim et al. |
| 2008/0201320 A1 | 8/2008 | Hong et al. |
| 2008/0201348 A1 | 8/2008 | Edmonds et al. |
| 2008/0256143 A1 | 10/2008 | Reddy et al. |
| 2008/0270729 A1 | 10/2008 | Reddy et al. |
| 2009/0043824 A1 | 2/2009 | Claghorn |
| 2009/0234816 A1 | 9/2009 | Armstrong |
| 2010/0017850 A1 | 1/2010 | More et al. |
| 2010/0023854 A1 | 1/2010 | Song |
| 2010/0030752 A1 | 2/2010 | Goldentouch |
| 2010/0211432 A1 | 8/2010 | Yiu et al. |
| 2010/0278453 A1 | 11/2010 | King |
| 2011/0035805 A1 | 2/2011 | Barkan et al. |
| 2011/0099172 A1 | 4/2011 | Gaskill |
| 2011/0289105 A1 | 11/2011 | Hershowitz |
| 2011/0302162 A1 | 12/2011 | Xiao |
| 2011/0302166 A1 | 12/2011 | Moriya et al. |
| 2012/0022951 A1 | 1/2012 | Tolompoiko et al. |
| 2012/0059822 A1 | 3/2012 | Malandain et al. |
| 2012/0060082 A1 | 3/2012 | Edala et al. |
| 2012/0072854 A1 | 3/2012 | Zhou |
| 2012/0078612 A1 | 3/2012 | Kandekar et al. |
| 2012/0078937 A1 | 3/2012 | Hall |
| 2012/0095984 A1 | 4/2012 | Wren-hilton et al. |
| 2012/0109741 A1 | 5/2012 | Ballapragada et al. |
| 2012/0109945 A1 | 5/2012 | Lapko |
| 2012/0233152 A1 | 9/2012 | Vanderwende et al. |
| 2012/0284290 A1 | 11/2012 | Keebler et al. |
| 2013/0046571 A1 | 2/2013 | Tuchman et al. |
| 2013/0159110 A1 | 6/2013 | Rajaram et al. |
| 2013/0173687 A1 | 7/2013 | Tuchman et al. |
| 2013/0185198 A1 | 7/2013 | Lorch |
| 2013/0218634 A1 | 8/2013 | Hills et al. |
| 2013/0246901 A1 | 9/2013 | Massand |
| 2013/0268405 A1 | 10/2013 | Yeh |
| 2013/0304906 A1 | 11/2013 | Yavilevich et al. |
| 2014/0006424 A1 | 1/2014 | Al-kofahi et al. |
| 2014/0075018 A1 | 3/2014 | Maycotte et al. |
| 2014/0143680 A1 | 5/2014 | Angarita et al. |
| 2014/0164352 A1 | 6/2014 | Denninghoff |
| 2014/0214825 A1 | 7/2014 | Zhang et al. |
| 2014/0316930 A1 | 10/2014 | Jain et al. |
| 2014/0365319 A1 | 12/2014 | Huang et al. |
| 2015/0012449 A1 | 1/2015 | Jackson et al. |
| 2015/0039406 A1 | 2/2015 | Dubey et al. |
| 2015/0039686 A1 | 2/2015 | Chetlur et al. |
| 2015/0067037 A1 | 3/2015 | Ishihara |
| 2015/0154691 A1 | 6/2015 | Curry et al. |
| 2015/0248917 A1 | 9/2015 | Chang et al. |
| 2015/0262069 A1 | 9/2015 | Gabriel et al. |
| 2015/0269691 A1 | 9/2015 | Bar Yacov et al. |
| 2016/0080810 A1 | 3/2016 | Dutta et al. |
| 2016/0232143 A1 | 8/2016 | Fickenscher et al. |
| 2016/0232204 A1 | 8/2016 | Zholudev et al. |
| 2016/0239512 A1 | 8/2016 | Madisch et al. |
| 2016/0239579 A1 | 8/2016 | Zholudev et al. |
| 2016/0342591 A1 | 11/2016 | Zholudev et al. |
| 2016/0344828 A1 | 11/2016 | Hausler et al. |
| 2017/0147546 A1 | 5/2017 | Ishii et al. |
| 2017/0344541 A1 | 11/2017 | Haeusler et al. |
| 2018/0082183 A1 | 3/2018 | Hertz et al. |
| 2018/0107755 A1 | 4/2018 | Zholudev et al. |
| 2018/0232367 A1 | 8/2018 | Häusler et al. |
| 2018/0246888 A1 | 8/2018 | Zholudev et al. |
| 2019/0034424 A1 | 1/2019 | Alvares et al. |

(56) References Cited

U.S. PATENT DOCUMENTS

2019/0213220 A1 7/2019 Zholudev et al.
2019/0213221 A1 7/2019 Zholudev et al.

OTHER PUBLICATIONS

"U.S. Appl. No. 15/040,109, Supplemental Amendment filed Jun. 8, 2018", 6 pgs.
"U.S. Appl. No. 15/040,133, Non Final Office Action dated May 22, 2018", 11 pgs.
"European Application Serial No. 16154974.6, Summons to Attend Oral Proceedings mailed Aug. 9, 2018", 8 pgs.
"U.S. Appl. No. 15/040,133, Corrected Notice of Allowability dated Jul. 9, 2020", 2 pgs.
"U.S. Appl. No. 15/950,010, Advisory Action dated Apr. 17, 2020", 3 pgs.
"U.S. Appl. No. 15/950,010, Non Final Office Action dated Apr. 28, 2020", 13 pgs.
"U.S. Appl. No. 16/146,545, Corrected Notice of Allowability dated Jul. 22, 2020", 2 pgs.
"U.S. Appl. No. 16/146,545, Notice of Allowance dated Jun. 5, 2020", 8 pgs.
"U.S. Appl. No. 15/040,133, Examiner Interview Summary dated Mar. 21, 2019", 3 pgs.
"U.S. Appl. No. 15/040,133, Final Office Action dated Jan. 11, 2019", 11 pgs.
"U.S. Appl. No. 15/040,133, Response filed Apr. 11, 2019 to Final Office Action dated Jan. 11, 2019", 11 pgs.
"U.S. Appl. No. 15/159,028, Examiner Interview Summary dated Aug. 28, 2018", 4 pgs.
"U.S. Appl. No. 15/159,028, Non Final Office Action dated Aug. 7, 2018", 16 pgs.
"U.S. Appl. No. 15/159,028, Notice of Allowance dated Dec. 20, 2018", 19 pgs.
"U.S. Appl. No. 15/159,028, Response filed Sep. 28, 2018 to Non Final Office Action dated Aug. 7, 2018", 18 pgs.
"U.S. Appl. No. 15/847,152, Examiner Interview Summary dated Mar. 7, 2019", 3 pgs.
"U.S. Appl. No. 15/847,152, Notice of Allowance dated Apr. 5, 2019", 9 pgs.
"U.S. Appl. No. 15/847,152, Response filed Mar. 1, 2019 to Non Final Office Action dated Oct. 3, 2018", 11 pgs.
"U.S. Appl. No. 16/146,545, Examiner Interview Summary dated Mar. 14, 2019", 3 pgs.
"U.S. Appl. No. 16/146,545, Response filed Feb. 28, 2019 to Non Final Office Action dated Nov. 28, 2018", 8 pgs.
"U.S. Appl. No. 16/146,545, Supplemental Amendment filed Mar. 11, 2019", 6 pgs.
"European Application Serial No. 16170497.8, Communication Regarding Oral Proceedings mailed Dec. 6, 2018", 11 pgs.
"European Application Serial No. 16170497.8, Response filed Nov. 12, 2018 to Summons to Attend Oral Proceedings mailed May 4, 2018", 38 pgs.
"European Application Serial No. 16170497.8, Summons to Attend Oral Proceedings mailed May 4, 2018", 38 pgs.
Dejean, Herve, et al., "A System for Converting PDF Documents into Structured XML Format", ECCV 2016 Conference; [Lecture Notes in Computer Science; Lect.Notes Computer], Springer International Publishing, Cham, (Feb. 13, 2006), 129-140.
Phelps, et al., "Robust intra-document locations", Computer Networks, vol. 33, Issue 1-6,, (Jun. 2008), 105-118.
"U.S. Appl. No. 15/040,133, Advisory Action dated May 15, 2019", 3 pgs.
"U.S. Appl. No. 15/040,133, Appeal Brief filed Dec. 11, 2019", 11 pgs.
"U.S. Appl. No. 15/040,133, Notice of Allowance dated Mar. 20, 2020", 7 pgs.
"U.S. Appl. No. 15/682,236, Non Final Office Action dated Aug. 13, 2019", 10 pgs.
"U.S. Appl. No. 15/682,236, Notice of Allowance dated Jan. 8, 2020", 9 pgs.
"U.S. Appl. No. 15/682,236, Response filed Dec. 12, 2019 to Non Final Office Action dated Aug. 13, 2019", 7 pgs.
"U.S. Appl. No. 15/950,010, Examiner Interview Summary dated Apr. 8, 2020", 3 pgs.
"U.S. Appl. No. 15/950,010, Examiner Interview Summary dated Nov. 4, 2019", 3 pgs.
"U.S. Appl. No. 15/950,010, Final Office Action dated Feb. 5, 2020", 16 pgs.
"U.S. Appl. No. 15/950,010, Non Final Office Action dated Jun. 28, 2019", 14 pgs.
"U.S. Appl. No. 15/950,010, Response filed Apr. 6, 2020 to Final Office Action dated Feb. 5, 2020", 11 pgs.
"U.S. Appl. No. 15/950,010, Response filed Oct. 28, 2019 to Non-Final Office Action dated Jun. 28, 2019", 9 pgs.
"U.S. Appl. No. 15/965,666, Corrected Notice of Allowability dated Dec. 4, 2019", 2 pgs.
"U.S. Appl. No. 15/965,666, Non Final Office Action dated Jun. 12, 2019", 9 pgs.
"U.S. Appl. No. 15/965,666, Notice of Allowance dated Sep. 30, 2019", 9 pgs.
"U.S. Appl. No. 15/965,666, Response filed Sep. 12, 2019 to Non-Final Office Action dated Jun. 12, 2019", 6 pgs.
"U.S. Appl. No. 16/146,545, Examiner Interview Summary dated Mar. 2, 2020", 3 pgs.
"U.S. Appl. No. 16/146,545, Examiner Interview Summary dated Nov. 4, 2019", 3 pgs.
"U.S. Appl. No. 16/146,545, Final Office Action dated Jun. 3, 2019", 14 pgs.
"U.S. Appl. No. 16/146,545, Non Final Office Action dated Jan. 7, 2020", 13 pgs.
"U.S. Appl. No. 16/146,545, Response filed Feb. 27, 2020 to Non Final Office Action dated Jan. 7, 2020", 10 pgs.
"U.S. Appl. No. 16/146,545, Response filed Nov. 1, 2019 to Final Office Action dated Jun. 3, 2019", 9 pgs.
"European Application Serial No. 16154974.6, Response Filed May 13, 2019 to Summons to Attend Oral Proceedings mailed Aug. 9, 2018", 10 pgs.
"U.S. Appl. No. 15/040,133, Examiner Interview Summary dated Nov. 29, 2018", 3 pgs.
"U.S. Appl. No. 15/040,133, Response filed Sep. 24, 2018 to Non Final Office Action dated May 22, 2018", 10 pgs.
"U.S. Appl. No. 15/847,152, Non Final Office Action dated Oct. 3, 2018", 22 pgs.
"U.S. Appl. No. 16/146,545, Non Final Office Action dated Nov. 28, 2018", 14 pgs.
"U.S. Appl. No. 16/353,635, Non Final Office Action dated Sep. 14, 2020", 19 Pages.
"U.S. Appl. No. 16/146,545, 312 Amendment filed Sep. 30, 2020", 7 pgs.
"U.S. Appl. No. 16/146,545, PTO Response to Rule 312 Communication dated Oct. 7, 2020", 2 pgs.
"U.S. Appl. No. 16/353,635, Non-Final Office Action dated Sep. 14, 2020", 19 pgs.
"U.S. Appl. No. 16/353,635, Response filed Oct. 12, 2020 to Non-Final Office Action dated Sep. 14, 2020", 8 pgs.
"U.S. Appl. No. 16/353,716, Non-Final Office Action dated Oct. 2, 2020", 16 pgs.
Athar, A., "Sentiment Analysis of Scientific Citations", Technical Report No. 856, University of Cambridge, (Jun. 2014), 1-114.
Peleja, F., "Ranking Linked-Entities in a Sentiment Graph", 2014 IEEE/WIC/ACM International Joint Conferences on Web Intelligence (WI) and Intelligent Agent Technologies (IAT), (2014), 118-125.
"U.S. Appl. No. 15/040,109, Advisory Action dated Jul. 21, 2017", 2 pgs.
"U.S. Appl. No. 15/040,109, Examiner Interview Summary dated Mar. 13, 2018", 4 pgs.
"U.S. Appl. No. 15/040,109, Examiner Interview Summary dated Sep. 8, 2017", 4 pgs.
"U.S. Appl. No. 15/040,109, Examiner Interview Summary dated Sep. 22, 2016", 2 pgs.

(56) References Cited

OTHER PUBLICATIONS

"U.S. Appl. No. 15/040,109, Final Office Action dated Apr. 6, 2017", 9 pgs.
"U.S. Appl. No. 15/040,109, Final Office Action dated Nov. 2, 2017", 20 pgs.
"U.S. Appl. No. 15/040,109, First Action Interview—Pre-Interview Communication dated Sep. 23, 2016", 9 pgs.
"U.S. Appl. No. 15/040,109, Response filed Mar. 2, 2018 to Final Office Action dated Nov. 2, 2017", 10 pgs.
"U.S. Appl. No. 15/040,109, Response filed Jul. 6, 2017 to Non Final Office Action dated Apr. 6, 2017", 8 pgs.
"U.S. Appl. No. 15/040,109, Response filed Oct. 24, 2016 to Pre-Interview Communication", 4 pgs.
"U.S. Appl. No. 15/040,127, Final Office Action dated Jan. 30, 2017", 11 pgs.
"U.S. Appl. No. 15/040,127, Non Final Office Action dated Jun. 28, 2017", 13 pgs.
"U.S. Appl. No. 15/040,127, Non Final Office Action dated Aug. 11, 2016", 13 pgs.
"U.S. Appl. No. 15/040,127, Notice of Allowance dated Feb. 8, 2018", 9 pgs.
"U.S. Appl. No. 15/040,127, Response filed May 30, 2017 Final Office Action dated Jan. 30, 2017", 9 pgs.
"U.S. Appl. No. 15/040,127, Response filed Nov. 14, 2016 to Non Final Office Action dated Aug. 11, 2016", 10 pgs.
"U.S. Appl. No. 15/040,127, Response filed Nov. 28, 2017 to Non Final Office Action dated Jun. 28, 2017", 11 pgs.
"U.S. Appl. No. 15/040,133, Examiner Interview Summary dated Feb. 8, 2018", 3 pgs.
"U.S. Appl. No. 15/040,133, Examiner Interview Summary dated Apr. 6, 2017", 2 pgs.
"U.S. Appl. No. 15/040,133, Final Office Action dated Sep. 25, 2017", 11 pgs.
"U.S. Appl. No. 15/040,133, First Action Interview—Pre-Interview Communication dated Nov. 18, 2016", 4 pgs.
"U.S. Appl. No. 15/040,133, Non Final Office Action dated May 4, 2017", 10 pgs.
"U.S. Appl. No. 15/040,133, Response filed Jan. 25, 2018 to Final Office Action dated Sep. 25, 2017", 12 pgs.
"U.S. Appl. No. 15/040,133, Response filed Aug. 4, 2017 to Non Final Office Action dated May 4, 2017", 11 pgs.
"U.S. Appl. No. 15/040,133, Response filed Dec. 19, 2016 to Pre-Interview Communication dated Nov. 16, 2016", 4 pgs.
"U.S. Appl. No. 15/040,139, Examiner Interview Summary dated Mar. 6, 2017", 3 pgs.
"U.S. Appl. No. 15/040,139, Final Office Action dated Jun. 12, 2017", 23 pgs.
"U.S. Appl. No. 15/040,139, Non Final Office Action dated Nov. 18, 2016", 22 pgs.
"U.S. Appl. No. 15/040,139, Notice of Allowance dated Aug. 30, 2017", 7 pgs.
"U.S. Appl. No. 15/040,139, Response filed Feb. 21, 2017 to Non Final Office Action dated Nov. 18, 2016", 11 pgs.
"U.S. Appl. No. 15/040,139, Response filed Apr. 3, 2017 to Non Final Office Action dated Nov. 18, 2016", 13 pgs.
"U.S. Appl. No. 15/040,139, Response filed Aug. 14, 2017 to Final Office Action dated Jun. 12, 2017", 9 pgs.
"U.S. Appl. No. 15/158,989, First Action Interview—Office Action Summary dated Oct. 17, 2016", 15 pgs.
"U.S. Appl. No. 15/158,989, First Action Interview—Pre-Interview Communication dated Aug. 23, 2016", 14 pgs.
"U.S. Appl. No. 15/158,989, First Action Interview—Response filed Dec. 19, 2016 to Office Action Summary dated Oct. 17, 2016", 9 pgs.
"U.S. Appl. No. 15/158,989, Notice of Allowance dated Feb. 9, 2017", 9 pgs.
"U.S. Appl. No. 15/158,989, Notice of Allowance dated Jun. 9, 2017", 5 pgs.
"U.S. Appl. No. 15/158,989, Response filed Sep. 23, 2016 to Pre-Interview Communication", 4 pgs.
"European Application Serial No. 16154974.6, Communication Pursuant to Article 94(3) EPC dated Dec. 20, 2017", 9 pgs.
"European Application Serial No. 16154974.6, Extended European Search Report dated Jun. 17, 2016", 6 pgs.
"European Application Serial No. 16154974.6, Response filed Feb. 17, 2017 to Extended European Search Report dated Jun. 17, 2016", 9 pgs.
"European Application Serial No. 16154974.6, Response filed Apr. 30, 2018 to Communication Pursuant to Article 94(3) EPC dated Dec. 20, 2017", 14 pgs.
"European Application Serial No. 16170497.8, Communication pursuant to Article 94(3) EPC dated Jul. 8, 2017", 7 pgs.
"European Application Serial No. 16170497.8, Extended European Search Report dated Oct. 13, 2016", 10 pgs.
"European Application Serial No. 16170497.8, Response filed May 23, 2017 to Extended European Search Report dated Oct. 13, 2016", w/ English Translation, 18 pgs.
"European Application Serial No. 16170497.8, Response filed Dec. 18, 2017 to Communication pursuant to Article 94(3) EPC dated Jul. 8, 2017", 15 pgs.
Bond, "How to create DVD-like Menus in MP4—MP4Menu", [Online]. Retrieved from the Internet: <https://forum.doom9.org/showthread.php?s=&threadid=66583>, (Dec. 11, 2003).
Huang, Jeff, et al., "No Clicks, No Problem: Using Cursor Movements to Understand and Improve Search", Human Factors in Computing Systems, ACM, 2 Penn Plaza, Suite 701, New York NY 10121-0701 USA, (May 7, 2011), 1225-1234.
Nayak, Amol, "MongoDB Cookbook", In: "MongoDB Cookbook", Packt Publishing, XP055299231, (Nov. 30, 2014), 106-110.
Tewari, Anand Shankar, et al., "Book recommendation system based on combine features of content based filtering, collaborative filtering and association rule mining", 2014 IEEE International Advance Computing Conference (IACC), IEEE, (Feb. 21, 2014), 500-503.
Wu, Lili, et al., "The Browsemaps: Collaborative Filtering at LinkedIn", Proceedings of the 6th Workshop on Recommender Systems and the Social Web (RSWeb 2014), Retrieved from the Internet:<URL:http://ceur-ws.org/Vol-1271/Paper3.pdf> [retrieved on Aug. 30, 2016], (Oct. 6, 2014).
Zeni, et al., "A lightweight approach to semantic annotation of research papers", In Proceedings of the 12th international conference on Applications of Natural Language to Information Systems, Springer-Verlag, (2007), 61-72.

```xml
<?xml version="1.0"?>
<article article-type="research-article">
    <front>
        +<journal-meta>
        +<article-meta>
    </front>
    <body>
        <sec id="s1">
            <title>Introduction</title>
            <p>This is the first sentence of the first paragraph of the introduction. This is the second sentence of the introduction, which mentions previous studies published by <xref rid="pub-123-Smith1" ref-type="bibr">Smith et al.</xref>. This is the third sentence of the introduction ... </p>
            <p> This is the first sentence of the second paragraph of the introduction ... </p>
        </sec>
        <sec id="s2">
            <title>Materials and Methods</title>
            <p>This is the description of the experiments performed, which references a test setup depicted in <xref rid="pub-123-g001" ref-type="fig">Figure 1</xref>. Detail about the test setup follows ... </p>
        </sec>
        +<sec id="s3">
        +<sec id>="s4>
        <fig id="pub-123-g001" position="float" orientation="portrait">
            <label>Figure 1</label>
            <caption>Test setup</caption>
            <graphic xlink:href="pone.0096565.g001"/>
        </fig>
        ...
    </body>
    <back>
        <ref-list>
            <title>References</title>
            <ref rid="pub-123-Smith1">
                <author ><surname>Smith</surname><givennames>Paul A.</givennames></author>
                <article-title>Comparative study on mice and monkeys</article-title>
                <year>2015</year>
            </ref>
            ...
        </ref-list>
    </back>
</article>
```

FIG. 3A

```
{"id" : "h1",
 "sourceId" : "s1",
 "type" : "heading",
 "props" : {"level" : "1"},
 "title" : ["t1"]}
```
— 300

```
{"id" : "t1",
 "type" : "text",
 "data" : "Introduction",
 "annotations" : [ ]}
```
— 301

```
{"id" : "p1",
 "type" : "paragraph",
 "children" : [ "t2" ]}
```
— 302

```
{"id" : "t2",
 "type" : "text",
 "data" : "This is the first sentence of the first paragraph of the introduction. This is the second sentence of the introduction, which mentions previous studies published by Smith et al. This is the third sentence of the introduction ...",
 "annotations" : [ {"type" : "citation_reference", "props" : { }, "path" : "pos:165-pos:176","targetIds" : [ "ct1" ] } ]}
```
— 303

```
{"id" : "ct1",
 "sourceId" : "pub-123-Smith1",
 "type" : "citation",
 "rawCitation" : "SmithPaul A. Comparative study on mice and monkeys, 2015" }
```
— 304

FIG. 3B

```
"views": {

"content": ["h1","p1","p2","h2","p3",..., "fig1", ...],

"references": ["ct1", "ct2", "ct3", ...]

"resources": ["ct1", "ct2", "fig1", "ct3", "tb1", "fig2", ...]

This is the first sentence of the first paragraph on this page. This is the second sentence of the first paragraph. This is the third sentence of the first paragraph. This is the fourth sentence of the first paragraph. This is the last sentence of the first paragraph.

This is the first sentence of the second paragraph, which references FIG. 2. The second sentence includes a couple of literature citations ([3], [4]).

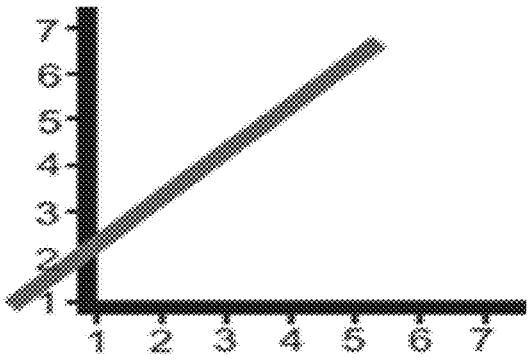

FIG. 2 This is the figure caption for this graph.

This is the first sentence of the third paragraph, which talks about FIGS. 3A and 3B. The second sentence of the third paragraph elaborates further. The third sentence of the third paragraph is longer than the other sentences and will extend into the right text column. In the fourth sentence of the third paragraph, we have an additional citation ([5].)

This is the first sentence of the fourth paragraph. This is the second sentence of the fourth paragraph. This is the third sentence of the fourth paragraph. This is the fourth sentence of the fourth paragraph. This is the fifth sentence of the first paragraph. This is the sixth sentence of the fourth paragraph ([6], [7], [8]). This is the seventh sentence of the fourth paragraph. This is the eighth sentence of the fourth paragraph. This is the ninth sentence of the fourth paragraph. This is the tenth sentence of the fourth paragraph.

This is the first sentence of the fifth paragraph. This is the second sentence of the fifth paragraph. This is the third sentence of the fifth paragraph. This is the fourth sentence of the fifth paragraph. This is the fifth sentence of the fifth paragraph.

This is the first sentence of the sixth paragraph. This is the second sentence of the sixth paragraph. This is the third sentence of the sixth paragraph. This is the fourth sentence of the sixth paragraph. This is the fifth sentence of the sixth paragraph.

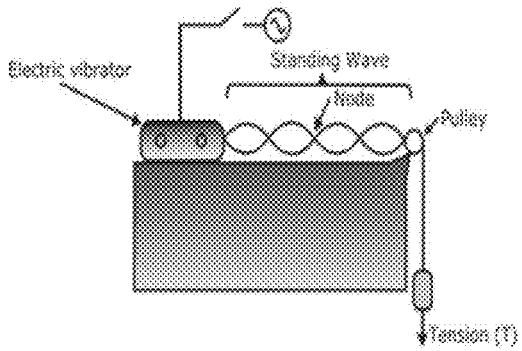 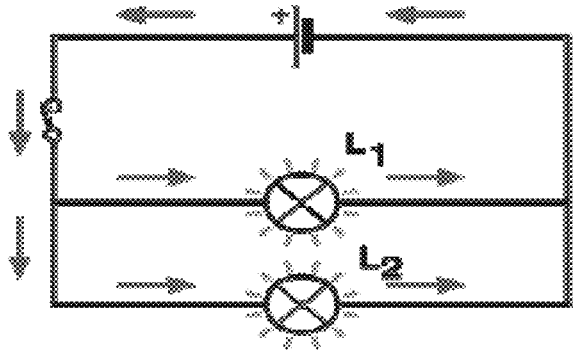

FIG. 3A This is the figure caption for the schematic on the left. FIG. 3B This is the figure caption for the circuit on the right.

FIG. 6A

This is the first sentence of the first paragraph on this page. This is the second sentence of the first paragraph. This is the third sentence of the first paragraph. This is the fourth sentence of the first paragraph. This is the last sentence of the first paragraph.

This is the first sentence of the second paragraph, which references FIG. 2. The second sentence includes a couple of literature citations ([3], [4]).

This is the first sentence of the third paragraph, which talks about FIGS. 3A and 3B. The second sentence of the third paragraph elaborates further. The third sentence of the third paragraph is longer than the other sentences and will extend into the right text column. In the fourth sentence of the third paragraph, we have an additional citation ([5].)

This is the first sentence of the fourth paragraph. This is the second sentence of the fourth paragraph. This is the third sentence of the fourth paragraph. This is the fourth sentence of the fourth paragraph. This is the fifth sentence of the first paragraph. This is the sixth sentence of the fourth paragraph ([6], [7], [8]). This is the seventh sentence of the fourth paragraph. This is the eighth sentence of the fourth paragraph. This is the ninth sentence of the fourth paragraph. This is the tenth sentence of the fourth paragraph.

This is the first sentence of the fifth paragraph. This is the second sentence of the fifth paragraph. This is the third sentence of the fifth paragraph. This is the fourth sentence of the fifth paragraph. This is the fifth sentence of the fifth paragraph.

This is the first sentence of the sixth paragraph. This is the second sentence of the sixth paragraph. This is the third sentence of the sixth paragraph. This is the fourth sentence of the sixth paragraph.

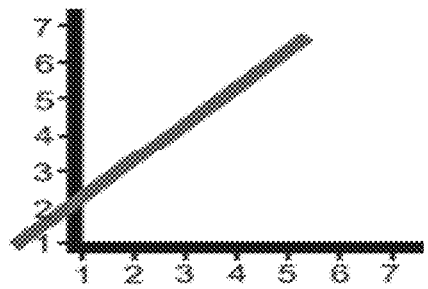

FIG. 2 This is the figure caption for this graph.

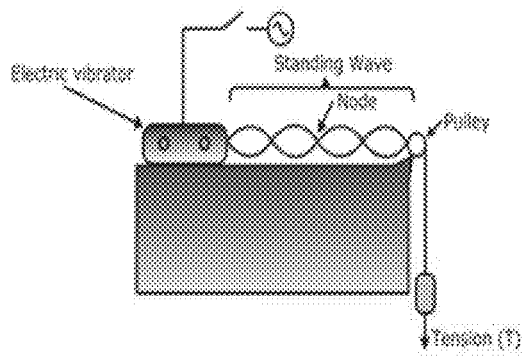

FIG. 3A This is the figure caption for the schematic on the left.

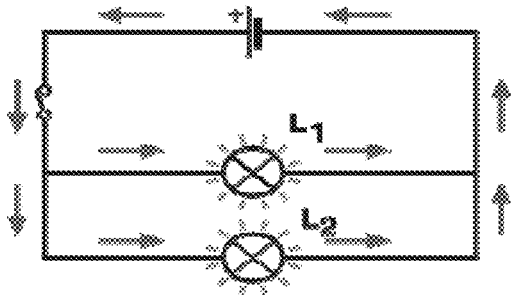

FIG. 3B This is the figure caption for the circuit on the right.

FIG. 6B

This is the first sentence of the first paragraph on this page. This is the second sentence of the first paragraph. This is the third sentence of the first paragraph. This is the fourth sentence of the first paragraph. This is the last sentence of the first paragraph.

This is the first sentence of the second paragraph, which references FIG. 2. The second sentence includes a couple of literature citations ([3], [4]).

This is the first sentence of the third paragraph, which talks about FIGS. 3A and 3B. The second sentence of the third paragraph elaborates further. The third sentence of the third paragraph is longer than the other sentences and will extend into the right text column. In the fourth sentence of the third paragraph, we have an additional citation ([5].)

This is the first sentence of the fourth paragraph. This is the second sentence of the fourth paragraph. This is the third sentence of the fourth paragraph. This is the fourth sentence of the fourth paragraph. This is the fifth sentence of the first paragraph. This is the sixth sentence of the fourth paragraph ([6], [7], [8]). This is the seventh sentence of the fourth paragraph. This is the eighth sentence of the fourth paragraph. This is the ninth sentence of the fourth paragraph. This is the tenth sentence of the fourth paragraph.

This is the first sentence of the fifth paragraph. This is the second sentence of the fifth paragraph. This is the third sentence of the fifth paragraph. This is the fourth sentence of the fifth paragraph. This is the fifth sentence of the fifth paragraph.

This is the first sentence of the sixth paragraph. This is the second sentence of the sixth paragraph. This is the third sentence of the sixth paragraph. This is the fourth sentence of the sixth paragraph.

[3] King, D.S. "Electrical circuits with citrus fruit," Journal of Electricity, vol. 4, May 2001 Go to source

[4] Ferdinand, R.M. "On currents and voltages," Journal of Scientific Investigations, vol. 13, 2011 Go to source

[5] Wayne, J.L. "Principles of mechanical action," Proceedings of the International Mechanical Society, November 2007 Go to source

[6] Li, M.C. "Correlations in spike patterns with neural activity," Biomedical Journal, vol. 14, May 2009 Go to source

[7] Donald, W. "Neurology," 2$^{nd}$ edition, Rochester Press, Rochester 2000 Go to source

[8] Kaiser, R.V. "Mouse Trap Technology. A Historical Review" Annals of Technology, vol. 1, 1979 Go to source

FIG. 6C is the fourth sentence of the first second sentence includes a couple of literature citations ([3], [4]).

This is the first sentence of the third paragraph, which talks about FIGS. 3A and 3B. The second sentence of the third paragraph elaborates further. The third sentence of the third paragraph is longer than the other sentences and will extend into the right text column. In the fourth sentence of the third paragraph, we have an additional citation ([5]).

This is the first sentence of the fourth paragraph. This is the second sentence of the fourth paragraph. This is the third sentence of the fourth paragraph. This is the fourth sentence of the fourth paragraph. This is the fifth sentence of the first paragraph. This is the sixth sentence of the fourth paragraph ([6], [7], [8]). This is the seventh sentence of the fourth paragraph. This is the eighth sentence of the fourth paragraph. This is the ninth sentence of the fourth paragraph. This is the tenth sentence of the fourth paragraph.

This is the first sentence of the fifth paragraph. This is the second sentence of the fifth paragraph. This is the third sentence of the fifth paragraph. This is the fourth sentence of the fifth paragraph. This is the fifth sentence of the fifth paragraph. This is the first sentence of the sixth paragraph. This is the second sentence of the sixth paragraph. This is the third sentence of the sixth paragraph. This is the fourth sentence of the sixth paragraph.

This is the first sentence of the sixth paragraph. This is the second sentence of the sixth paragraph. This is the third sentence of the sixth paragraph. This is the fourth sentence of the sixth paragraph. This is the fifth sentence of the fifth sixth paragraph.

[3] King, D.S. "Electrical circuits with citrus fruit," Journal of Electricity, vol. 4, May 2001 *Click here*

[4] Ferdinand, R.M. "On currents and voltages," Journal of Scientific Investigations, vol. 13, 2011 *Click here*

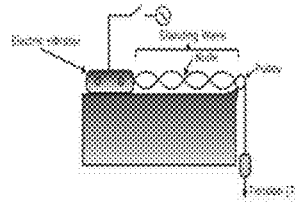

FIG. 3A This is the figure caption for the schematic on the left.

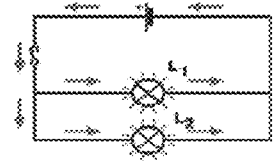

FIG. 3B This is the figure caption for the circuit on the right.

[5] Wayne, J.L. "Principles of mechanical action," Proceedings of the International Mechanical Society, November 2007 *Click here*

[6] Li, M.C. "Correlations in spike patterns with neural activity," Biomedical Journal, vol. 14, May 2009 *Click here*

[7] Donald, W. "Neurology," 2$^{nd}$ edition, Rochester Press, Rochester 2000 *Click here*

[8] Kaiser, R.V. "Mouse Trap Technology. A Historical Review" Annals of Technology, vol. 1, 1979 *Click here*

 J. Ullrich
Mackenzie University

This paragraph needs clarification. It is not clear how the conclusions are drawn from the data.

FIG. 6D

```
{"id" : "a4278",
 "type" : "anchor",
 "props" : {"subtype" : "sentence-hash"},
 "path" : ["pub123","s1","pos:203"]}
```

FIG. 9A

```
"views": {"content": ["h1", "p1","a3562", "p2","a9384", "h2","p3",..., "fig1", ...]}
```

FIG. 9B

```
{"id" : "p1",
 "type" : "paragraph",
 "children" : [ "t2", "a4278", "t3", "a5297"]}
```

FIG. 9C

ONLINE PUBLICATION SYSTEM AND METHOD

CROSS-REFERENCE TO RELATED APPLICATION

This application is continuation of U.S. patent application Ser. No. 15/040,127, filed on Feb. 10, 2016, which claims priority to and the benefit of, and incorporates herein by reference in its entirety, U.S. Provisional Application No. 62/114,341, filed on Feb. 10, 2015.

BACKGROUND

Research articles and similar publications, whether disseminated in print or electronically (e.g., in the form of PDF documents), are conventionally created and consumed in static form, i.e., in a manner that does not allow modifying or supplementing the content post-publication. This severely limits the ways in which authors and readers can interact with the published content. For example, for readers, the fixed structure and layout of the publication may render it difficult to focus on a specific aspect of interest (as portions of interest are generally interspersed with other, potentially distracting content). Further, carrying on a public discourse about a publication may be cumbersome, as it generally involves communication vehicles and channels separate from the publication itself, such as additional articles referencing the discussed work, or online or offline discussion fora. For the author of a research article, publishing any revisions to the article may be limited to very narrow circumstances (e.g., a retraction or correction of clearly erroneous statements), and publishing any updates to the research itself is usually a protracted and tedious process that may take the form of an entirely new publication; as a consequence, the threshold for publishing research in the first place is typically very high.

BRIEF DESCRIPTION OF THE DRAWINGS

FIG. 3A is an example of a document in an intermediate XML, format, in accordance with various embodiments.

FIGS. 3B and 3C are JSON data structures for a few example document-element entries and various example document views, in accordance with various embodiments.

FIGS. 6A-6D are example user-interface diagrams schematically illustrating multiple views for an example document, in accordance with an embodiment.

FIGS. 9A-9C are examples of data structures for an anchor, a document element with nested anchors, and a document view including anchors, respectively, in accordance with various embodiments.

DESCRIPTION

Figure 1:
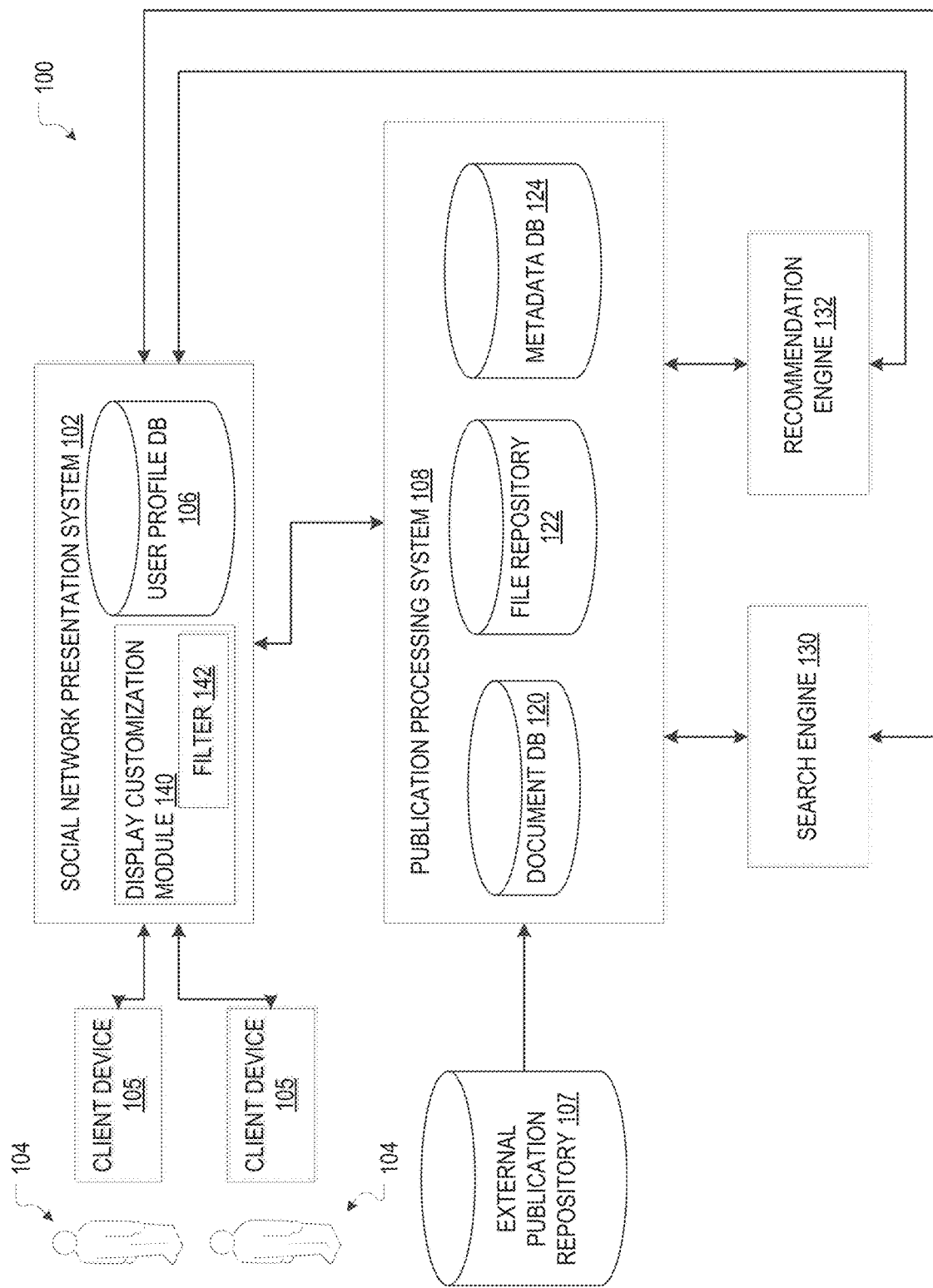
FIG. 1 is a block diagram of an example social-network and publication system in accordance with various embodiments.

Disclosed herein are systems and methods for creating, storing, structuring, displaying, enhancing, and referencing publications and related content in an online user network. In various embodiments, a technical platform is provided for converting unstructured documents (e.g., publications such as research articles, reviews of or comments on publications, etc.) into structured documents, or creating documents in a highly structured format in the first place, thereby providing a high level of granularity for consuming, annotating, modifying, and referencing the documents or portions thereof. To turn static documents into dynamic or "living" documents, the platform further provides versioning support, i.e., the ability to track modifications to a document from the time of its creation throughout its lifecycle. Further, to maintain referential integrity across different versions of a document, and to allow citations at a finer than document-level granularity, various embodiments implement an addressing scheme that combines unique document identifiers (hereinafter "keys") with sub-document addressing paths, anchors embedded throughout the document, and/or a suitable reference indexing system.

Beneficially, the technical platform described herein provides a convenient, low-friction, and low-cost way of publishing research or other documents, as well as for consuming and responding to published documents (e.g., via feedback in the form of ratings, comments, questions, or cross-references), thereby potentially accelerating the public discourse about and enriching interactions with the published content. Some embodiments afford users the opportunity to publish original research within the online context and receive a time-stamp therefor, thereby establishing precedent for their research. In addition, users may have the ability to submit their publications for feedback; in various embodiments, a recommendation engine can identify experts suitable, based, e.g., on their own publication record and other indicators of expertise, to providing such feedback.

The following description will describe these and other features in more detail with reference to various example embodiments. It will be evident to one skilled in the art that the features and characteristics of the different embodiments can be used in various combinations, and that not every embodiment need include all of the features disclosed. Further, while the present disclosure focuses on researchers and academic publications, certain aspects and features described herein may also be applicable to other user groups and types of publications. To name but a few examples, systems and methods in accordance herewith may find application in the publication of, and user exchange about, works of literature, film, art, or music; news and other journalistic publications; meal recipes; etc. The embodiments described herein may be adjusted to accommodate such other application contexts. A person of skill in the art will appreciate that certain embodiments and features described herein work particularly well, and provide particularly strong benefits, if applied to publications that follow strong conventions regarding structure and content (like scientific papers), thereby lending themselves to automated analysis as described herein.

FIG. 1 is a block diagram that provides an overview of an example social-network and publication system 100 in accordance herewith. The system 100 includes a social network presentation (sub-)system 102 through which users 104 at respective client devices 105 can interact with each other as well as with the content stored in the system. Users 104 may register with the social network presentation system 102 by providing user-profile information, such as a name, institutional affiliation, contact information (e.g., email address), etc., and establishing network-access credentials such as, e.g., a user name (which may be, e.g., her email address) and password. The user-profile information may be stored within a user-profile database 106 of the social network presentation system 102. In some embodiments, eligibility to register as a user 104 is based on certain conditions, such as academic credentials, and may be determined based on the user-provided profile information during sign-up. For example, eligibility to register may be established by providing an email address associated with an academic or research institution recognized by the system 100; a comprehensive list of such institutions may be established, and extended from time to time upon request and/or as necessary, by a system administrator. Alternative factors that may render a user eligible to register include, for instance, co-authorship of a publication posted by an existing registered user, or academic credentials proven to a system administrator in an application process.

Once registered, a user 104 may have the ability, via a user interface of the social network presentation system 102, to upload her publications to the system 100. Alternatively or additionally, the system 100 may conduct a batch import of publications, e.g., by downloading them from openly accessible third-party publication repositories 107 external to the system 100 (e.g., as provided on the web sites of many universities), and subsequently allow its users 104 to link their publications to their profile by claiming authorship (or co-authorship). For instance, as part of the sign-up process, the system may automatically present the new user 104 with a list of publications that match the user's name (and optionally his institutional affiliation), and request confirmation from the user 104 that he is, indeed, an author of this publication. Sometimes, to comply with the copyrights of third-party publishers, users 104 may upload final drafts of their works, but not the final typeset publication as it appeared in the third-party journal. Alternatively to uploading a publication directly to the system 100, a user 104 may enter bibliographic information and/or provide a link to an external web site where the publication is available (e.g., for purchase). Further, in some embodiments, a user 104 may input the publication contents in a structured form used by the system 100, instead of uploading a single full-text file for the publication. A "publication," as used herein, may be a work already published by a third party (i.e., outside the social-network environment) (to the extent allowed by copyright law), such as an academic article included in a scientific journal, or, alternatively, a (perhaps preliminary) work first published within the social-network environment, such as a draft of an academic article that has not yet been submitted for publication to any journal (and may not be intended for such submission). In particular, in various embodiments, users are encouraged to publish original research directly on the system 100. For example, users 104 may receive a time stamp for a publication posted originally on the system 100, which establishes a precedent for their research.

The system 100 further includes a publication processing system 108 that forms the core of its back-end. In various embodiments, the publication processing system 108 includes functionality for converting documents provided in any of a variety of unstructured or structured document formats (such as PDF, Word, Latex, XML, HTML, or other formats) into a common highly structured format internal to the system (explained in more detail below with reference to FIG. 2). In the internal format, a document is represented in terms of its constituting elements—such as, e.g., paragraphs of text, images, tables, specially formatted text portions like citations, etc.; the level of granularity with which a document is broken up into such elements (e.g., section vs. paragraph vs. sentence vs. word) may vary between embodiments. The individual elements may be stored as entries of a document database 120, and the document as a whole may be represented as an ordered list of its elements. Some of the elements, such as images, may have contents contained in individual binary files (which may not be amenable to further meaningful subdivision), which may be stored in a separate file repository 122 and linked to by the database entries of the respective elements. The publication processing system 108 may further extract and store metadata uniquely identifying each publication (such as the authors, title, and other bibliographic information) in a metadata database 124; such metadata may serve to represent and locate publications within the system and establish connections between publications, people (e.g., authors), institutions, and/or other entities.

The structured internal format in which publications are stored, in accordance with various embodiments, provides great flexibility in designing and tuning the layout of a document for display, allowing readers, for example, to selectively view only certain document portions of interest (e.g., only the figures, or only the citations). Further, it facilitates enriching the document with references and/or links to related content, mentioned in the document, that is likewise stored in, or at least known to, the system. For example, when identifying the author of a publication, the publication processing system 108 may automatically insert a link to the author's public user profile within the social network presentation system 102. As another example, when finding, within a given publication, a citation to another article that is likewise available within the system, the publication processing system 108 may automatically link to the cited article. The publication processing system 108 may also enrich documents with other relevant content stored externally to the document (and internally or externally to the system 100), or references or links thereto, including, e.g., graphic representations of mathematical formulae or the structure of chemical compounds, links to DNA sequences or proteins (e.g., as available on the Protein DataBank at http://www.rcsb.org), links to descriptions of products or machinery, or references to clinical trial information (e.g., available at http://www.clinicaltrials.gov), public funding information, etc.

In some embodiments, users 104 have the ability to interact with a publication, for instance, by asking questions or providing feedback in various forms (ranging from brief annotations to full-blown reviews, and including, e.g., ratings or labels, textual comments, relevant citations to other publications, or references to other related content (such as, e.g., data posted by the feedback-providing user)). In this context, the highly structured internal document format facilitates referencing or interacting with specific document portions rather than the document as a whole. For example, it enables a user to post a question, comment, or citation in association with the particular publication portion (e.g., a particular section of text, or a particular figure) to which it pertains. The dissection of the document into multiple constituent elements may also allow authors (or, more generally, users with editing privileges) to make changes to particular portions of the publication without requiring re-uploading the entire document; for example, a user may simply add a paragraph of text or substitute one figure for another. In conjunction with suitable version identifiers or time stamps, storing different version of individual document elements, rather than of the entire document, allows reconstructing the history of a document without unnecessarily duplicating stored content. A suitable referencing system may be used to maintain referential integrity across multiple versions of a document, i.e., to ensure that annotations made to a document within the system and references to the document from outside the system are always associated with the version of a document portion to which they pertain.

The system 100 may provide search functionality, via a search engine 130, that allows users to search for publications of interest based on, for example, the field of research, the author's name, or specific citation information. Alternatively or additionally, a recommendation engine 132 may automatically provide a list of potential publications of interest based on the user's profile (which may include, e.g., a list of her research interests and/or a list of her own publications) and/or other user-specific information (e.g., her prior search and browsing history within the network). Whether provided in response to a search request or as an independent system recommendation, publications may be ranked based on various criteria (in addition to their relevancy to the user's request or the match to the user's interests in general), including, e.g., the recency of the publications, the feedback they've received, the reputation of their authors, the number of times they've been cited, etc.

In addition to recommending publications to users, the recommendation engine 132 may also provide functionality for identifying and recommending users as experts on the topic of a given publication, e.g., in response to a request for feedback submitted by the author, or a review request submitted by a consumer of a publication. Candidate-expert users may be identified based on research areas, general reputation, and other criteria. Among the candidates, recommended experts may be identified based on a match between the contents of the publication (or publication portion) on which feedback is requested with the contents created by various candidate-expert users, most notably their own publications, but also possibly reviews and other feedback they have previously provided. In some embodiments, a review or feedback can be requested for a particular portion of the publication (rather than the publication as a whole), and a suitable expert can be identified, using machine-implemented recommendation logic, based at least in part on a comparison of contents of the selected publication portion with the contents of documents (publications, reviews, etc.) published by the various candidate experts. In this manner, a fine-tuned expert recommendation targeted on the portion for which feedback is sought can be made. Once one or more recommended experts have been ascertained, they may be invited, e.g., via automatic, system-generated messages, to provide the requested feedback.

Structured Document Representation and Conversion of Unstructured Documents

Figure 2:
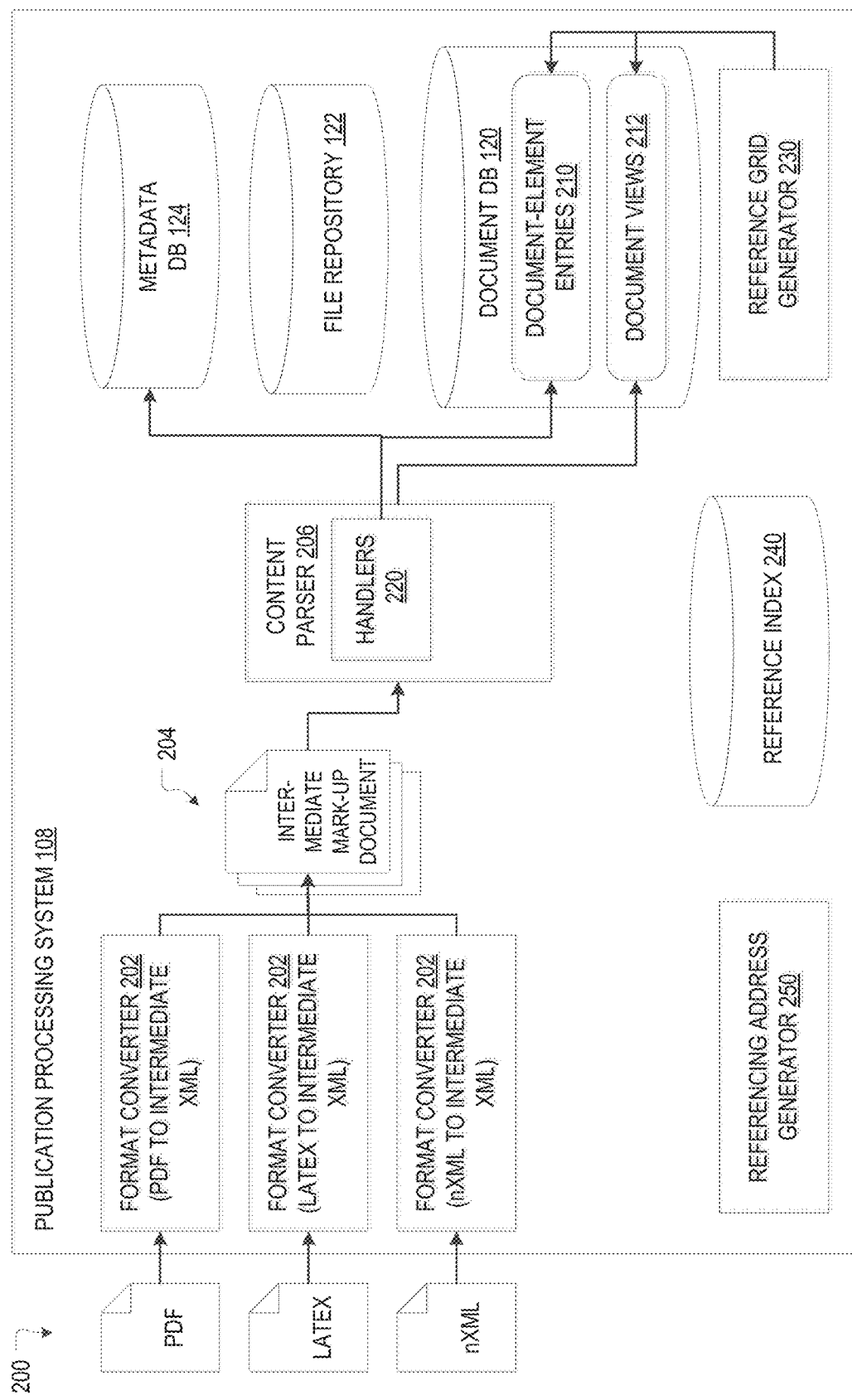
FIG. 2 is a data flow diagram illustrating, in more detail, the components and function of an example publication processing system in accordance with various embodiments.

FIG. 2 illustrates in more detail an example publication processing system 108 in accordance with various embodiments. The publication processing system 108 may be adapted to take publications or other documents 200 as input in a variety of unstructured or structured file formats, such as, for example and without limitation, PDF, Word, EPUB, Latex, DocBook, nXML, or HTML. A number of format converters 202 specific to these various external data formats may be used to convert the input documents 200 into respective "intermediate documents" 204 in a common internal mark-up-language format (e.g., a specific XML format) that serves as an intermediate format for parsing the document contents. For a structured input document 200, e.g., a document in Latex, HTML, or some other format that uses tags to identify various document parts (such as headings, paragraphs, figures, tables, or specially formatted text (like boldfaced or italicized text, superscripts and subscripts, etc.)), the associated format converter 202 may utilize a look-up table or other mapping between the tags available in the input format and corresponding tags defined for the intermediate format to identify the various document parts and translate them into the syntax of the intermediate format. For an unstructured input document 200, the associated format converter 202 may be configured to ascertain various document parts and the text flow based on visual clues (such as different font types and sizes used for headings, white space at the end of paragraphs or surrounding figures, etc.), optionally in conjunction with information about formatting conventions adhered to in particular groups or types of documents. For example, a format converter 202 for PDF documents may have publication-formatting information for different journals, specifying, e.g., whether the page layout includes one or two columns of text; what font sizes are used for title, section headings, and subheadings; how figures, tables, and formulas are embedded, numbered, and referenced in the text; etc. Such information may increase the accuracy with which different document parts are identified. Format converters 202 for unstructured document formats may also include specialized routines to extract certain types of contents from the documents. For instance, to capture a figure and associated figure caption, padding around the rectangular frame of the figure may be used.

The illustrated publication processing system 108 further includes a content parser 206 configured to analyze the intermediate document 204 to break it up into multiple document elements, populating the document database 120 storing respective document-element entries 210 in the process. The database entry for each element may include a unique document-element identifier and at least one document-element attribute characterizing the content. The number and kinds of document-element attributes stored for each document element may be a function of the type of element. For example, for a document element consisting of a portion of text, the attribute may simply be a string containing the text. By contrast, for a document element including a figure, one attribute may store the figure caption as a string, and another attribute may store a pointer or link to the figure itself, which, in turn, may be saved as a binary file in the file repository 122, separate from the document database 120. The document-element entries 210 themselves may be stored in JavaScript Object Notation (JSON) format. In some embodiments, the database entry for each document element further includes an attribute explicitly specifying the type of document element (e.g., paragraph, figure, table, superscript, etc.). Such type attributes may be used, e.g., in filtering document elements for a customized document display, as described in more detail below with reference to FIG. 5). Document elements that contain further document elements nested therein, such as paragraphs that include sub- or superscripts or highlighted text, may include a further document-element attribute listing the document-element identifiers of these nested elements as "children."

The document as a whole may be represented as an ordered list of its constituent document elements, which may be stored as a "document view" 212 in the document database 120 (or, alternatively, a separate database). In the document view 212, the document elements may be identified by the document-element identifiers of respective entries 210 in the document database 120. The list of document elements may include nested elements. In some embodiments, the list of elements is stored in the form of a text string, with brackets indicating any nesting. In alternative embodiments, the document view 212 includes only top-level document elements; in this case, the document order of document elements can be reconstructed from the view in conjunction with the children listed within the document elements. Document views 212 may be assigned respective view identifiers.

The content parser 206 may further extract certain metadata descriptive of the document (such as its title, authors, and other bibliographic information) and store it separately in the database 124 for publication metadata. A publication metadata entry within this database 124 uniquely represents a particular publication (possibly with multiple associated versions) within the system. By contrast, multiple versions of the same publication result in multiple document views 212 being stored in the document database 120. In some instances, comparison of the publication metadata extracted from a newly input document against the database 124 for publication metadata reveals a match with a publication already represented in the database 124. The newly input document may, for example, be a new version of an existing publication, or the first-time upload of a full-text of the publication (for which the system 100 may have, previously, only stored the metadata and possibly a link to an external site). In such cases, the system 100 may associate the document view 212 generated for the newly received document with the existing publication metadata. For example, as described further below, the view identifier may include a portion specifying the publication or document to which the view belongs, and a portion specifying the version of the document. Different views for a given publication may differ in the selection and/or order of document elements they include, and may serve to capture, e.g., different versions of the document or differently customized display options (as explained in detail below). Views may also allow, in some embodiments, displaying some document elements differently than others. For example, in an "editing view" tailored to a given user, document elements that have been edited by the user may be highlighted in some manner. This can be achieved, e.g., by labelling the elements to be highlighted in some manner within the list of document elements.

In various embodiments, the content parser 206 breaks up the document into its constituent elements using a set of element-specific handlers 220 (which may be implemented, e.g., as sub-modules of the content parser 206). Each handler 220 is associated with a particular type of document element and configured to process elements of that type, e.g., to generate suitable document-element entries 210 in the document database 120, extract and store any associated binary files in the file repository 122, and/or create or update data in the database 124 for publication metadata or in other databases or repositories. The creation of document-element entries 210 by operation of the handlers 220 and the creation of the document view 212 may be implemented in various ways, using different orders of operation. In some embodiments, the content parser 206 sequentially parses the intermediate document 204, identifying document-element types and calling the respective handlers 220 to create document-element entries 210 with unique document-element identifiers in the database 120, and listing each document-element identifier in the document view 212 upon creation of the respective document-element entry 210. In other embodiments, the content parser 206 initially parses the intermediate document 204 to create the document view 212 by identifying the document elements (though not necessarily their types) and assigning document-element identifiers that are written to both the view and the intermediate document 204. Thereafter, the set of handlers 220 can be run over the intermediate document 204 asynchronously to extract the contents of each document element and create respective document-element entries 210, each identified in the database 120 by its previously assigned document-element identifier. In yet other embodiments, the set of handlers 220 is organized into a hierarchy of handlers that are applied to the document in layers so as to recursively break up the document into its elements. In this case, the document view 212 can be updated iteratively for each layer of handlers 220 by inserting the document-element identifiers for newly created document-element entries 210 in the list of elements at the appropriate place. In one example embodiment, a first layer of handlers 220 initially splits the document into only three portions: a front portion or "header" of the document that includes the metadata to be written to the database 124 for publication metadata (which, in academic publications, typically includes the title, authors and affiliations, journal name, volume, and page if applicable, and abstract); a body of the document; and a back portion of the document that includes a list of citations. Another layer of handlers 220 may then parse the body portion to identify conventional publication sections (such as introduction, experiments, results, analysis, conclusion) and/or separate text from figures, tables, formulae, etc. Within text portions, a third layer of handlers 220 may identify certain types of formatting, such as boldfacing, superscripts and subscripts, and so on. In this manner, a hierarchy of handlers 220 may be used to ultimately convert the document 204 from the intermediate mark-up-language format into a flattened node structure of document elements. (Of course, as will be readily appreciated by one of ordinary skill in the art, different embodiments may differ in the details of their internal formats and the types of elements associated therewith.)

In various embodiments, the content parser 206, when dissecting the intermediate document 204 into its elements, further enriches the document contents by linking the document elements, where appropriate, with related content within or external to the system 100. For instance, for a document element storing the name of an author, the content parser 206 may include, as one of the element's attributes, a link to the author's public user profile (e.g., as maintained within the social network presentation system 102) or an external web site containing information about the author. As another example, when the content parser 206 encounters a citation in the document, it may search the database of publication metadata 124 for the cited publication and, if the cited publication is represented within the system 100, include a link thereto in the document element for the citation. Links may also be included to institutions (e.g., universities, research facilities, etc.); products or vendors mentioned in a document (e.g., certain chemicals, laboratory equipment, etc.); grants or other funding sources for the research underlying the publication; publicly available information about drugs and clinical trials (e.g., as provided by the Federal Drug Administration), chemical compounds and materials (e.g., material safety data sheets); DNA sequences; or other types of systematized information.

FIGS. 3A-3C provide examples of a document in intermediate XML format and a few document elements and document views in JSON format, illustrating a structured document representation in accordance with various embodiments. In the example XML, document, shown in FIG. 3A, the document has been split into three portions: front, body, and back. The front portion includes various metadata about the article and journal in which it was originally published; the "+" preceding the respective tags <journal-meta> and <article-meta> indicates that the contents of these metadata portions are collapsed (i.e., further tags are nested inside, but not shown in the figure due to spatial constraints). The body portion is broken up into multiple sections (bracketed between <sec id+'_'> and </sec>, and in this example identified as "s1" through "s4"), which, in turn, include a section title and one or more paragraphs (contents of sections "s3" and "s4" are collapsed). Nested within the paragraphs are citations (e.g., <xref rid="pub-123-Smith1" ref-type="bibr">Smith et al. </xref>) and references to figures (e.g., <xref rid="pub-123-g001" ref-type="fig">Figure 1</xref>), represented by tags surrounding the referencing text portions (e.g., "Smith et al." or "Figure 1") within the paragraphs and including identifiers for the respective citations or figures. Data for the figures, including metadata and links to the corresponding image files, are stored at the end of the body portion enclosed between tags <fig id+' ' . . . > and </fig>. The back portion of the document includes, in this example, a list of references (<ref-list>) that contains the actual citation information of references cited in the text. The back portion may also contain an appendix, supplementary materials, or generally any type of information in addition to the core publication that the author wants to include. Of course, element types other than figure and citation references may be nested within the paragraphs (or referenced within the flow of the body outside the paragraphs); depending on the type, they may be included in the body or the back portion, or not listed separately at all. (For example, nested elements for bold-faced or otherwise specially formatted text generally need not be listed separately.)

FIG. 3B shows JSON code for a few document elements extracted from the XML, document of FIG. 3A. For example, the section heading "Introduction" is represented by a document-element entry 300 that includes the identifier "h1," specifies section "s1" as the parent node (or "source") of the heading, further specifies the element type "heading" and indicates in an element property attribute that this is a level-1 heading, and contains the text of the title by virtue of a reference to a separate document-element entry 301 identified by "t1" and storing the text "Introduction." The heading text could, in principle, be stored directly within the data structure 300 ("title": "Introduction"). Referencing a separate text element, as shown, serves to facilitate more complex section headings, such as headings including text portions and formulas, which may be represented as arrays of multiple elements. (For uniformity, arrays may be used for all heading titles, even though they often include only a single text element.) As another example, the first paragraph within the introduction is represented by a document-element entry 302 that includes the identifier "p1," specifies the element type "paragraph," and lists "t2" as a child-node. The contents of "t2" are stored in a separate document-element entry 303 of type "text," which includes the paragraph text as a "data" attribute. The citation reference embedded within the text is stored within the "t2" element 303 as an "annotation" attribute, which specifies the type of annotation ("citation_reference"), the location of the reference within the text (i.e., the "path"), and an identifier of the citation itself ("ct1"). The citation is stored in yet another document-element entry 304.

FIG. 3C illustrates three example views generated from the XML document of FIG. 3A. A "content" view includes an ordered list of the top-level document elements (such as section headings (e.g., "h1"), paragraphs (e.g., "p1"), and figures (e.g., "fig1")), which collectively constitute the contents of the document body. Document elements nested within the top-level document elements need not be explicitly listed, but are implicitly included by virtue of their status as "children" of the top-level elements, and will be retrieved (recursively, if there are multiple levels of children) when the content view of the document is assembled, e.g., for display in a user interface. A "references" view includes only the citations. Similar views can exist for the figures, for all tables, all formula, etc. A "resources view" may include self-contained objects extracted from the document regardless of type, such as citations, figures, and tables (e.g., "tb1"). Of course, other types of "mixed views" containing selected document elements of various types may be created. Certain views, such as contents and back views, are basic in that they serve to collectively capture all of the document contents, whereas others, such as figures or resources views, are derived in that they can be reconstructed from the basic views (e.g., using suitable filters) and are stored primarily for more expedient retrieval.

Figure 4:
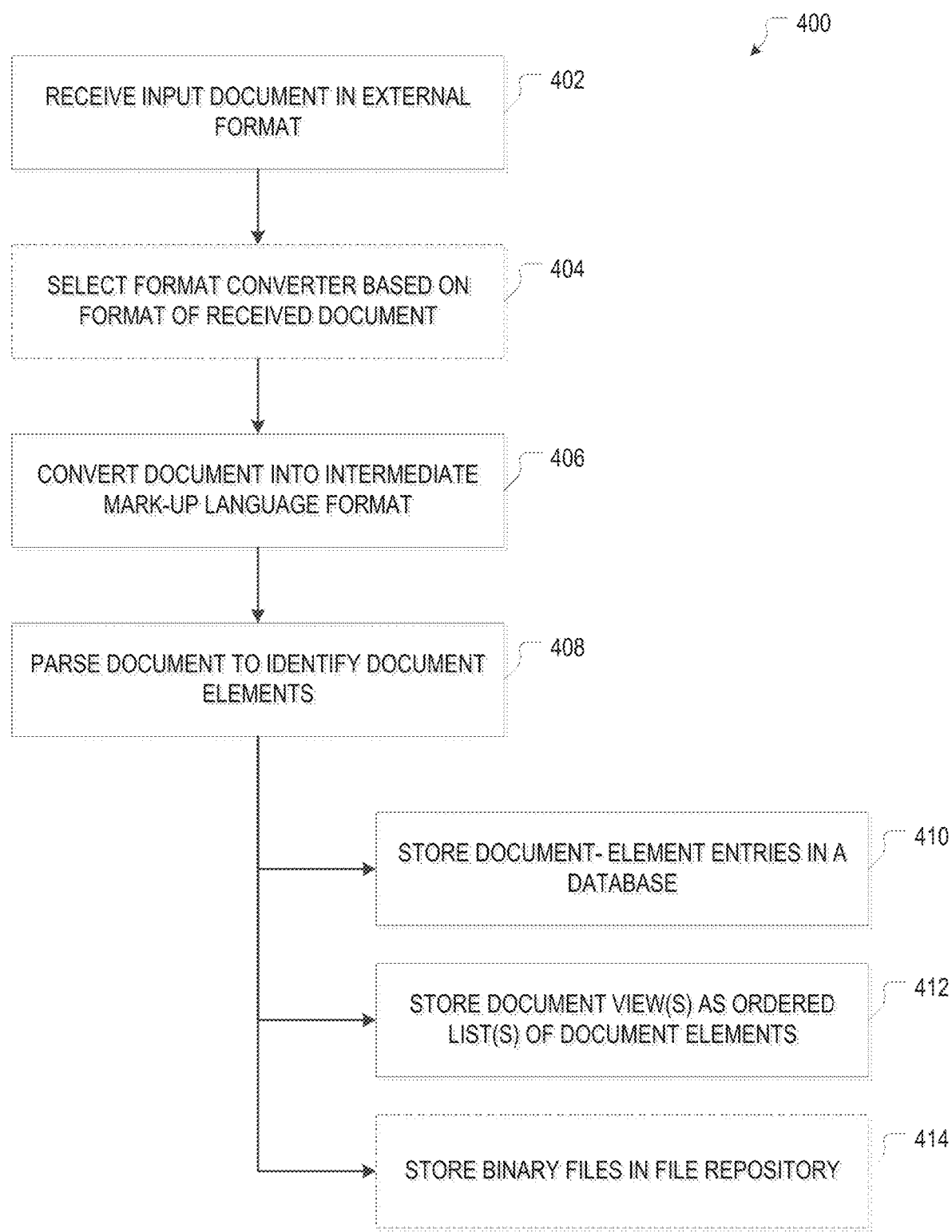
FIG. 4 is a flow chart of an example method for converting unstructured documents into a structured representation, in accordance with various embodiments.

FIG. 4 is a flow chart for an example method 400 of converting documents from an external format into a structured internal format, in accordance with various embodiments. Upon receipt of an input document 200 in a structured or unstructured external format (at 402), the format of the document 200 may be determined to select an appropriate format converter 202 (action 404). Using the format converter 202, the document is converted from the external format into an intermediate mark-up-language (e.g., XML) format (action 406). The resulting intermediate document 204 is then parsed (action 408) to identify the individual document elements that, collectively, constitute the document contents (including certain formatting elements like superscripts, italicized text, etc.). The document elements may be identified based on a plurality of document-element types associated with the internal format (e.g., including paragraphs, figures, different types of text formatting, etc.). Entries for the identified document elements are stored in a database (e.g., document database 120) (action 410), as are one or more document views, i.e., ordered lists of the document elements (action 412). Any binary files (such as, e.g., images) included in the document are stored in a file repository 122 (action 414). As described above, the storage of the document-element entries, document views, and binary files may occur in varying order, depending on the particular embodiment and details of the parsing process.

Consumption of Structured Document

In some embodiments, a user, when viewing a particular publication, has the option to customize the display to include only certain portions of the publication content she is interested in while omitting others, or to reorder the contents. For example, the user may want to see only the table of contents, only the figures, only the citations, or only the results section of an article (including the figures), but not more general sections like the introduction or conclusion. Alternatively, the user may want to rearrange the document, e.g., to have all figures displayed at the end rather than interspersed in the text. Various common selections of content from a publication may be pre-computed and stored as different views of the document that differ in the sub-sets of document elements they contain or in the order in which document elements are presented. Alternatively, views may be generated on the fly by applying appropriate filters to a document view that includes all document elements. While pre-computed views are useful for contents that are static or change infrequently, filtering provides a suitable way for customizations that are based on dynamic contents. For example, a user may want to see only document elements with annotations, which may change frequently, rendering pre-computation impractical or at least computationally expensive due to the need for frequent re-computation.

To enable display customizations for publications (or other documents), the social network and presentation system 102, depicted in FIG. 1, may include a display customization module 140 that augments the user interface in which publications are displayed with one or more suitable user-interface elements for user selection of the type of content she is interested in. For example, a drop-down menu may allow a user to select between text only, figures only, citations only, different named sections of a publication (e.g., background, materials and methods, result, conclusion, etc.), annotated or recently edited portions of the publication, or other content selections as may occur to those of ordinary skill in the art. The customization module 140 may send a signal indicative of the user's selection to the publication processing system 108 to retrieve the appropriate view, or, if the selected view has not been pre-computed, retrieve a generic view and apply a filter 142 thereto, e.g., to filter the individual document elements based on the element types as may be reflected in a type attribute. As will be readily appreciated by one of ordinary skill in the art, the filter 142 may, alternatively, be implemented as part of the publication processing system 108.

Figure 5:
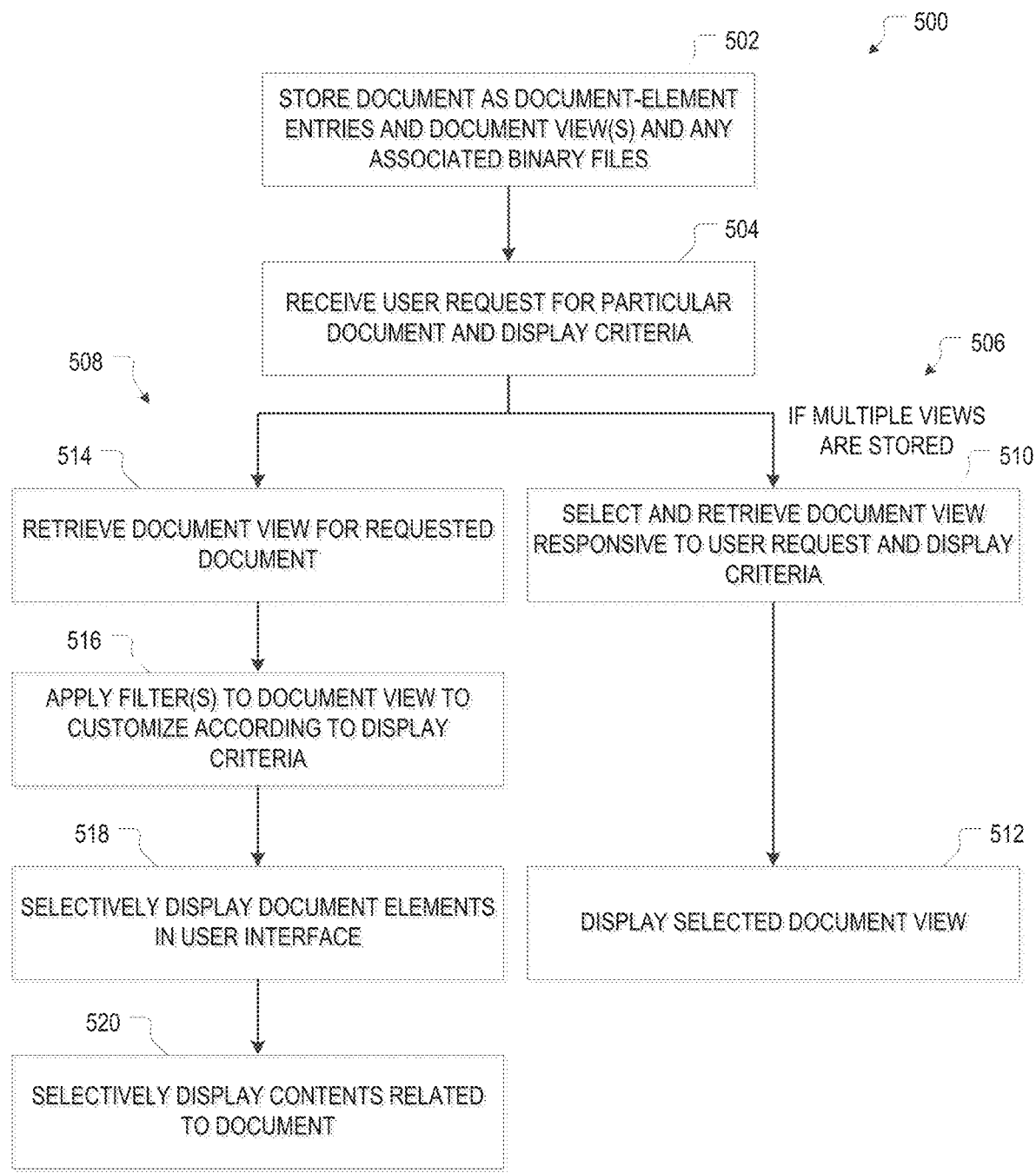
FIG. 5 is a flow chart of example methods for customizing the display of a document, in accordance with various embodiments.

FIG. 5 is a flow chart of example methods 500 of customizing the display of a document, in accordance with various embodiments. The methods 500 involve storing documents in the form of individual document elements (if applicable, with associated binary files) in conjunction with one or more document views for each document (action 502). Further, the methods 500 include receiving a user request for a particular document as well as display criteria (action 504). The display criteria may, for instance, include a user selection of certain document contents (e.g., types of elements, document sections, etc.) to be displayed to the exclusion of other document contents, or to be displayed first (e.g., with the remainder of document contents being shown at the end) or according to any other specified ordering of document elements, or to be highlighted (in a broad sense, e.g., by a change in font color, background color, font style, etc.). In some embodiments, the display criteria can also specify which contents related to the requested document are to be displayed (and how); such related contents include, e.g., annotations, comments, or links to contents referenced in the document. To display links to referenced content, the references in the document may, for instance, be highlighted (e.g., by underlining and/or a color change) and rendered executable/clickable.

The methods 500 bifurcate into two prongs 506, 508 for processing the user request. If multiple pre-computed views corresponding to the available display criteria are stored for the document requested by the user (prong 506), a document view responsive to the user's request and meeting the display criteria is selected and retrieved (action 510), and then displayed in the user interface (action 512). Otherwise (in prong 508), a generic document review for the requested document is retrieved (action 514), one or more filters are applied (action 516) to customize the document view in accordance with the display criteria. In some embodiments, the filtering is based on the document-element attributes. A filter may pass (or, alternatively, filter out), for example, document elements of a specified type (e.g., images) as reflected in the element-type attribute, or document elements whose date of creation falls within a certain range, or document elements that contain certain keywords, etc. Alternatively or additionally, filtering may be based on document-element selections determined from a separate index that references document elements. For example, an annotation index that stores annotations each in association with the document-element identifiers of document elements to which the annotation pertains may be used to identify and retrieve all annotated document elements of the requested document. Similarly, a citation index that stores cited publications each in association with the document-element identifier(s) of the document element(s) in which the citation appears may be used to identify and retrieve all document elements that contain citations or even that cite a particular publication specified in the display criteria. Yet another basis for filtering may be direct addressing of the document elements or portions to be displayed. The display criteria may, for instance, include a document path (a term defined in explained in more detail below in the section on sub-document-level addressing) that specifies a selected portion of the document (e.g., a certain section, or a range of numbered paragraphs) and can be resolved to the individual document elements. Following filtering (in whichever way), the document elements that pass the filter are selectively displayed, or displayed first, or highlighted, etc., in the user interface in accordance with the display criteria (action 518). In some embodiment, the customized document view is further enhanced by contents related to the document, displayed selectively in accordance with the display criteria (optional action 520).

FIGS. 6A-6D are example user-interface diagrams schematically illustrating multiple views for an example document, in accordance with an embodiment. FIG. 6A shows the original page layout for the document, which includes two columns of text with interspersed figures. FIG. 6B illustrates a view in which the text and figures have been visually separated, with text appearing on the left and figures appearing on the right; this view may also be thought of as a "figures-only" view displayed alongside a "text-only" view. Along with this rearrangement of the document contents, the originally paginated content may be converted into continuous content streams that can, e.g., be scrolled through on-screen (with scroll bars or other user-interface elements not shown in the figure for simplification). The screen portions containing the text and figure views may be independently navigable, allowing the user, e.g., to keep a particular figure on the screen while scrolling through the text to read different sections referencing that figure (which may have occurred on different pages in the original document layout). Alternatively, the two views may be interlocked such that, when the user scrolls through, e.g., the figures, the text-only view will automatically adjust to show the text portion where the figure currently in view is referenced for the first time. In either navigation mode, reference to figures in the text may be visually linked (e.g., by highlighting, as shown) to the figures displayed, or a particular figure selected, on the right. For example, when a user clicks on, say, FIG. 2 on the right, reference to FIG. 2 may be highlighted throughout the text on the left. In some embodiments, the user also has the option to resize the screen portions containing text and figures, e.g., by moving the boundary between the two views; or to switch between a vertical separation into columns and a horizontal separation into rows. The user interface may include further navigation elements, such as, e.g., milestone markers that inform a user what figure or section, out of a total number of figures or sections, she is currently at, or a navigation bar representing the document in its entirety and allowing the user to jump between sections without having to scroll through.

FIG. 6C shows, as a further example, a citations-only view alongside a text-only view (in which references to the citations appearing on the right may be highlighted, as shown, or otherwise visually linked). The navigation options described above for text and figures are equally applicable here. The citations view may be enriched by including, in addition to the citation information as it ordinarily appears at the end of a publication, executable links ("Go to source") to the cited publications. Various other content-type selections giving rise to different kinds of views will occur to those of ordinary skill in the art. Further, multiple types of content may be mixed in a single view. FIG. 6D illustrates, for instance, a mixed view including citations, figures, and annotations (e.g., user comments or other contents related, but external to, the document). As in the figures and citations views of FIGS. 6B and 6C, text portions referencing the contents displayed in the mixed view or to which a content item in the mixed view pertains may be highlighted in the text. In the illustrated example, the comment made by J. Ullrich pertains to the fifth paragraph, which is therefor highlighted on the left. Of course, the figures-only view, citations-only view, mixed view, or other kind of view need not accompany a text-only view, but may be shown by itself. Further, the simultaneous display of multiple views is not limited to two, and need not include a text-only view. In some embodiments, the user is given the opportunity to divide up the screen into three, four, or more (optionally resizable) panels, and display a selected subset of publication contents in each. As will be readily appreciated by those of ordinary skill in the art, such flexibility in customizing the display is contingent upon a structured representation of the document and identifiability of various types of document elements, e.g., as facilitated by the embodiments described herein.

Document Versioning

Different views of a document may also serve to capture different versions during the document's lifecycle. When a user uploads, for instance, an updated draft of a publication document, the content parser 206 may recognize, based on the metadata extracted from the document, that the document constitutes a modification of a publication that already exists in the system. Rather than storing each document element of the updated draft anew, the content parser 206 may then create new entries in the document database 120 for only those document elements that have changed relative to the previous document version. The document elements for the older version (or multiple older versions) remain unaffected, which allows any version of the document to be retrieved at any time. The updated draft as a whole may be stored as a separate document view 212 listing all its document elements, including both document elements overlapping with the previous document draft and any newly added document elements. Compared with the document view 212 of a previous version of a publication, the document view 212 of a new version generally differs by the omission of one or more document elements and/or the addition of one or more document elements. In particular, a change within a document element (such as, e.g., modified wording within a paragraph of text) will generally be reflected, in the new view 212, in the omission of the old document element (e.g., the paragraph with the original wording) and substitution thereof by the new document element (e.g., the paragraph containing the re-worded text). Accordingly, the document-element entries 210 themselves, as stored in the document database 120, are generally not versioned (or at least need not be), whereas the document views 212 are. Alternatively to storing a new document version in the form of a complete list of its constituent elements, it is also possible to store changes differentially with respect to a prior version. Thus, a document version may be defined by reference to a previous version in conjunction with lists of document elements that are to be removed from or added to the previous version to arrive at the new version. Either way, each document version may receive a time stamp that, allowing the history of the document—that is, the changes made to the document in time—to be reconstructed.

Figure 7:
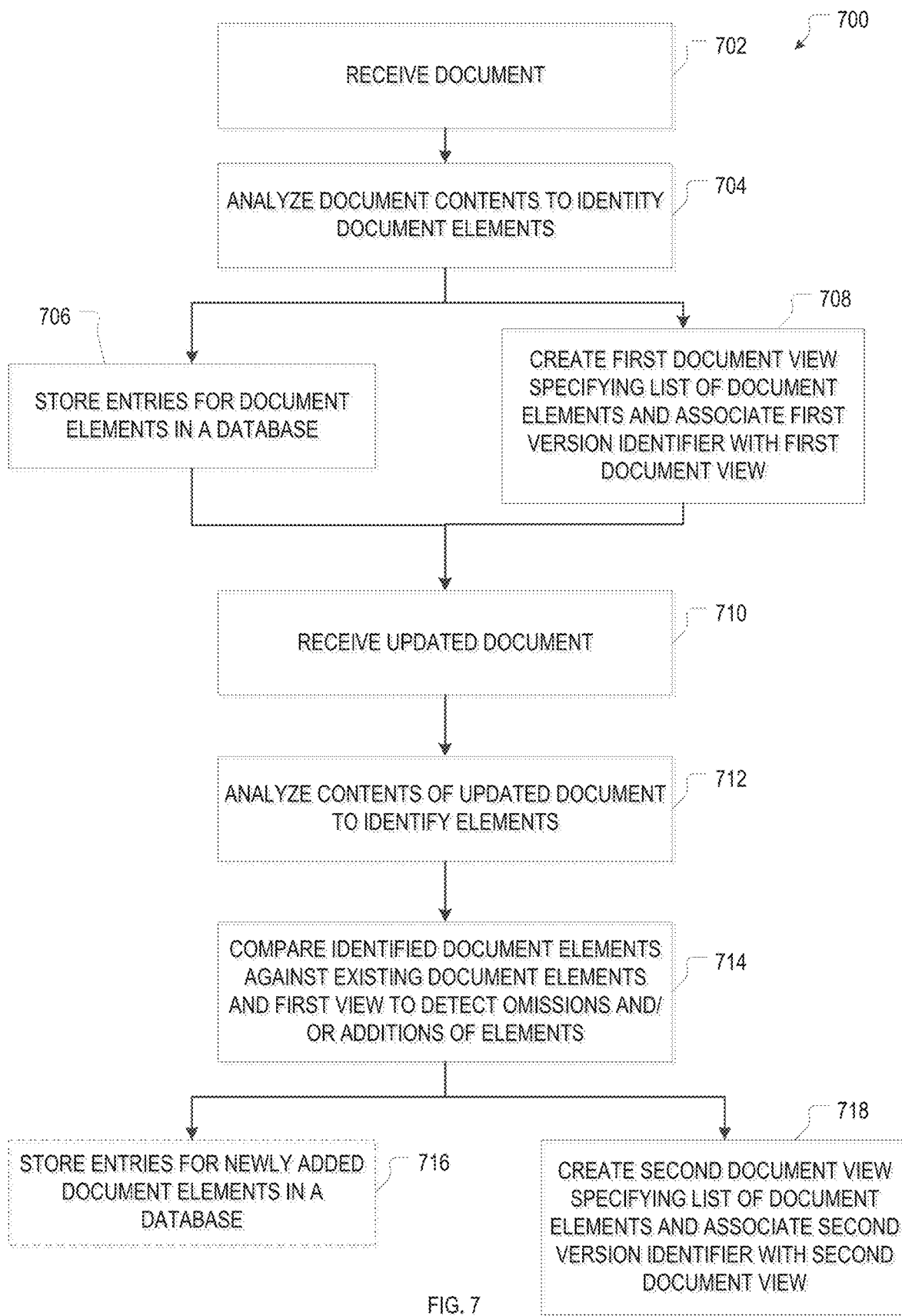
FIG. 7 is a flow chart of an example method for storing original and updated versions of a document, in accordance with various embodiments.

FIG. 7 is a flow chart of an example method 700 for storing original and updated versions of a document, in accordance with various embodiments. The method 700 involves, upon receipt of a document (e.g., the original document) (action 702), analyzing the contents of the document to identify the individual document elements (action 704), and storing the document elements in a document database 120 (action 706). Further, a first document view specifying the list of document elements is created and assigned a first version identifier (action 708). The version identifier may be (or be based on), e.g., a hash of the document-element identifiers associated with the document elements listed in the view. The creation of the document-element entries and document view in the database 120 may be achieved in the manner described above (e.g., with reference to FIGS. 2-4), e.g., using the content parser 206. The method 700 further includes receiving an updated document (or an updated document portion) (action 710). A newly submitted document can be recognized as an update to a document already existing in the system based on, e.g., metadata such as authors, title, etc. Upon receipt of the update, the updated document (or document portion) is analyzed to identify its constituent document elements (action 712). The identified document elements of the updated document (or document portion) are compared against the existing document elements in the database in conjunction with the listing of elements in the first view to detect the omission of any document elements and/or the addition of any new document elements (action 714). As mentioned above, the update to the document can be characterized fully in terms of such omissions or additions; in particular, a modification to a document element can be represented as the omission of that element and the addition of a new element. For any newly added document elements, a corresponding entry is created and stored in the database (action 716). Further, to represent the updated document, a second document view specifying an ordered list of document elements (including the elements retained from the original version as well as any newly added documents) is created and associated with a second version identifier (which may, again, be a hash of the document-element identifiers the view lists) (action 718).

Comparing the updated document (portion) against the original document (action 714) can be achieved in various ways. In some embodiments, the content of each document element identified in the updated document is compared sequentially against the contents of one or more document elements of the original document until a match is found or the comparison has been made with all document elements of the original document. If a match is found, the document-element identifier of the matching existing document element is simply written to the second document view. Otherwise, if the original document does not include any counterpart to a document element of the updated document, a new document-element entry with a new document-element identifier is created. In order to minimize the number of comparisons between document elements, the updated document may be dissected into its elements in the same manner and order as the original document (e.g., sequentially as the elements occur in the intermediate document 204, or recursively based on a hierarchy of handlers), and each document element of the updated document may, upon detection, be compared first to the document element in the original document that is most likely its counterpart. For example, the first element in the updated document may be compared against the first document element of the original document (as ascertained based on the order of elements in the first view), the second document element of the updated document may be compared against the second document of the original document, and so forth until a discrepancy is detected. At that point, the current document element of the updated document may be compared against a few document elements following the non-matching document element of the original document to determine whether the detected discrepancy results from the deletion or re-arrangement of one or more document elements (as opposed to the addition of a new element). Alternatively to comparing the contents of document element in the updated and original documents, the comparison may be made between document-element identifiers created, in a reproducible manner, from the contents of the respective document elements. Thus, when a document element has been identified in the updated document, its contents may be hashed to generate the document-element identifier, and the document database 120 may then be searched for an existing element with that identifier. If the document-element identifier cannot be found in the database 120, the respective document element is new and calls for creation of a new entry in the database 120.

View Identification and Chunking

In general, each document view within the database may be identified by a combination of a unique key for the publication to which the view belongs (as represented by the publication metadata, which generally does not change throughout the document's lifecycle) and a version or view identifier. The latter may be assigned or computed in various ways, for example, based on a suitable version-naming convention (e.g., "v1," "v2," etc.) or by hashing the contents of the views. Different document views belonging to the same publication may be stored within a single "document object" (e.g., a single file or data structure) for the publication, or, alternatively, as separate document objects (e.g., separate files or data structures). In some embodiments, views representing different content selections from the same version of a document are stored within the same document object. Views representing different versions may be stored within the same document object (corresponding to "internal versioning") or as separate document objects (corresponding to "external versioning"), depending, e.g., on the magnitude of the changes or designations made by the author. For example, while a document is being edited and small changes are frequently made, these changes (reflected in new document elements created in the database) may be tracked within the same document object, using time stamps or other version identifiers to facilitate reconstructing the state of the document either continuously at any point in time or at least at certain discrete times (e.g., every hour or day). By contrast, once editing is completed and the author wishes to officially "release" a new version of the document, this new version may be stored in a completely separate document object.

When creating document elements for multiple documents and modifications to the documents as they may be made at various points in time, the document elements may in principle be stored in the document database in the order in which they were created, resulting in the interleaving of different documents and document versions. When retrieving a particular document, the dispersed locations of its element across the database will generally necessitate multiple individual database accesses and, consequently, take up significant loading time. In some embodiments, this is to a large extent avoided by storing the contents of each document in one or more "chunks" of elements stored in adjacent rows of the database. For example, upon storage of the first element of a document within the database, a certain number of rows (e.g., the next ninety-nine rows) may be reserved for the next elements of that same document. Document elements belonging to a second, different document, even if created in the database prior to population of the first one hundred rows reserved for the first document, will be stored beginning in row 101, for example. Following a certain number of rows to be populated by the elements of the second document, a second chunk of the first document may be stored, and so on. This way, when a user requests a certain document to be displayed, the document can be loaded in typically just a few chunks, each including a set of contiguously stored document elements and thus requiring only one database search to locate the first element of the chunk.

Since chunks usually store document elements corresponding to a contiguous content portion of the document (e.g., the first page of the print version of a document), latency in the display of the document may be reduced by displaying a document chunk as soon as it is loaded, without awaiting the loading of following chunks. The chunk size may be selected to achieve a suitable trade-off between short loading times and the display of document portions large enough to be meaningful to the user. (To illustrate, waiting for the entire document to be loaded before displaying anything may cause an unacceptably long initial wait time for the user following her request, while loading and displaying the document one sentence at a time will likely be frustrating for the user due to the frequent interruptions before she can go on reading.) Accordingly, the chunk size may be based on expected bandwidth limitations, the user's browser cache, the amount of content that fits on a screen (without requiring scrolling down), and similar performance criteria associated with displaying the document. Chunk size may also be tuned based on the frequency and extent to which publication documents are edited. For example, chunks may be sized, when a document is initially saved in the internal format, to include sufficient space for storing document elements reflecting subsequent modifications. However, to avoid, where possible, jumping between different chunks for a single new version of a document, the remaining space in the first chunk may be left unpopulated, and the elements of a new document version that differs significantly from the old one may be stored in the second (or a higher-numbered) chunk right away. In some embodiments, document elements that persist from one document version to the next are duplicated between chunks to facilitate faster loading of a new version (avoiding the need to retrieve unaltered document elements from one chunk and modified elements from another chunk). Further, in some embodiments, the document elements for the most frequently requested pre-computed views are each contained within a single chunk.

Sub-Document-Level Addressing Scheme

In various embodiments, users have the ability to annotate a publication with questions, comments, citations to other publications, and the like. These annotations can be displayed along with the publication for viewing by other users. It is important, in this context, to remain referential integrity and display annotations only in association with the original document portions to which they pertain. For example, if a user comments that a certain paragraph needs clarification and the author thereafter posts an updated version of the publication in which he has re-worded that paragraph, the user comment should no longer appear along with the current version of the document (but should persist in the system in association with the older version). Similarly, external references to the publication (e.g., a citation to the publication occurring in another publication), including references made from outside the system to a publication within the system (e.g., a citation in an article published elsewhere to an article posted originally within the system), should always point to the same content, i.e., the content as it existed at the time the reference was made. To achieve such referential integrity across different versions of a document, and to allow annotations and citations to specific portions of the document (as opposed to the document as a whole) in the first place, various embodiments employ a combination of a document key uniquely identifying the publication and relevant version thereof, a document path specifying a certain portion or range of elements within the document and/or a grid of anchors distributed across the document that is robust to changes in the document and may facilitate referencing at an even finer level than the document elements afford, and a suitable bi-directional reference index.

The document key is generally canonical, i.e., stands in a bijective relationship to the document object (or version within a document object, to the extent multiple versions are stored within the same object) it is referencing (e.g., such that each document object or version has only one key and each key identifies only one document object or version). (In various embodiments, the document key is but one example of a more general "object key" used to identify any type of social object within the system, whether it be a user, item of content (e.g., publication, comment, etc.), or relation, for example.) In some embodiments, the document key is composed of strong and weak entities. A strong entity stands on its own and maps to a particular publication (as identified, e.g., by its associated metadata) or other self-contained document, whereas a weak entity only exists (and may be unique only) in relation to a strong entity and references a version of the publication, a particular file or other separately stored item of content contained in the publication (herein "asset"), or an annotation, comment, or other item of content related to and associated with the publication. Various embodiments utilize string-based keys that are readable by both humans and machines. For example, the strong entity may be structured as a domain-identifying pre-fix, such as "PB," followed by a domain-internal unique identifier, such as "1001," such that publication 1001 is identified by key "PB:1001." The second asset within publication 1001 (which may be, e.g., a figure) may be referenced as "PA:2" following the strong entity portion, i.e., as "PB:1001:PA:2." Similarly, the third comment on the publication may be referenced, for instance, as "C:3" following the strong entity portion, i.e., as "PB:1001:C:3." The document keys may be language-independent, allowing a key, for example, to be generated in Java code and resolved in PHP. The document key, which is generally used internally to the system 100, may map onto a unique uniform resource identifier (URI) or digital object identifier (DOI) that facilitates referencing the document, in the correct version, outside the system 100. When a document originally published externally and already having an associated URI or DOI is uploaded to the system 100, the URI or DOI may be extracted and stored, e.g., as part of the publication metadata or in a separate bi-directional index of document keys and URI/DOIs. When a document is originally published within the system 100, the system 100 may generate and assign a URI or DOI to be stored in the metadata, an index, or otherwise in association with the document key. Either way, when a user accessing a particular version of a document in the system executes a user-interface element to cite the document, she may be automatically provided the associated URI or DOI.

While the document key can serve to reference a document (in a particular version) in its entirety, the document path facilitates pinpointing a piece of content within the document, such as, for instance, a particular paragraph or even an individual sentence or word therein. (In the case of an asset or annotation to a document that is fully addressed by the strong and weak entities of the associated document key, the document path may nonetheless be stored to specify the location of the asset or annotation within the document.) A document path is generally not canonical in that multiple different paths may lead to the same content within the document. (However, each path resolves, of course, to a unique portion of content.) For example, for references generated within the system, the document path may specify a particular document element, or range of elements, in terms of the associated unique document-element identifiers. Such a document path may, for instance, look like "anc:ce46fa85-anc:fd79bc98," which identifies the range from anchor element (a particular kind of document element, as explained below) with identifier ce46fa85 to anchor element with identifier fd79bc98. The same range of elements may be identified, alternatively, with reference to certain named portions of the document (e.g., the "materials and methods" section), in terms of page or paragraph numbers, and the like; this more human-readable referencing scheme, which is independent of the system-assigned element identifiers, is typically employed in external references to content maintained within the system, but may also be used internally. In various embodiments, the system 100 includes functionality to translate the document path, in response to a user's request to cite a particular portion of a document (as issued, e.g., via a user-interface element "cite this article"), into human-readable citations according to multiple user-selectable style guides or citation formats. Examples of reference paths used internally and/or externally are "sec:1:par:2" (meaning: pointing to the second paragraph in the first section of a document, and relying on an unambiguous definition of a section), "sec: introduction:par:3" (pointing to the third paragraph of the introduction, which may be identified in the document database based on a document element labelled "introduction" in conjunction with counting document elements until the third paragraph is reached), "par:1-par:2" (specifying a range including the first and second paragraphs), and "page:2:lin:5:col:3-pag:2:lin:7:col:12" (specifying the range from page 2, line 5, column 3 to page 2, line 7, column 12). In various embodiments, modifications to a document trigger a check of and, if necessary, update to all references to portions of the document that might be affected by the change. Thus, if, for instance, a new paragraph is inserted between the second and third paragraphs, a reference to the previously third paragraph may be updated to now point to the currently fourth paragraph. On the other hand, if a change is made in the introduction of a document, a reference to the first paragraph within the results section does not require any update.

In some embodiments, a referencing grid can be generated for a document by creating a set of "anchors" dispersed throughout the document. Anchors are document elements without content that serve solely referencing purposes. Each anchor has its own unique document-element identifier and is stored in the document database just like any content-containing document element. Anchors may be placed between document elements as well as be nested within document elements. The latter may serve to localize references at a sub-element granularity. Assuming, for example, that each paragraph of text corresponds to a different document element, multiple anchors may be located within one document, e.g., at natural breakpoints of the paragraph, such as at the end of each sentence, or at punctuation marks or other markers associated with different parts of a sentence. Alternatively or additionally, anchors may be placed at regular intervals throughout the document (e.g., every five words). (To specify the location of an anchor within a content-containing document element or between document elements, the database entry for the anchor may store surrounding contents, or a signature derived therefrom, as an attribute. Note, however, that this does not render the anchor itself (as a conceptual entity distinguished from the database entry of the anchor) content-containing, as the contents of the original document (including formatting) can be assembled fully without use of the anchors. Put differently, the anchors may duplicate storage of some content for purposes of properly associating the anchors with the content-containing document elements.) When anchors have been generated for a particular document, they may be included in the document-element listing(s) that define the document view(s), and/or inserted as children into the entries of document elements in which they are nested. The creation of anchors within the document database and the document views may be accomplished by a special module within the publication processing system 108, such as the reference grid generator 230 depicted in FIG. 2.

Using the grid of anchors, annotations to the document may be made with reference thereto. For example, each paragraph within a document may be associated with an anchor element preceding (or, alternatively, following) the document element storing the paragraph's text. If a user highlights a paragraph to comment thereon, the comment may reference the anchor associated with the document element for that paragraph. If the paragraph is subsequently changed and the document element for the original paragraph thus omitted from the element listing for the new version, the anchor for the comment may likewise be omitted (by virtue of its association with an omitted content-containing document element). As a result, the comment will not be displayed along with the new version of the document. By contrast, a comment tied to an anchor preceding a content element that has not changed between versions will continue to be shown. Similarly, if a user highlights, for purposes of an annotation, a particular sentence within a paragraph that is represented as a single content-containing element, but has multiple anchor elements spread throughout, the system may locate the anchors closest to the beginning and end of the highlighted sentence, and reference the portion to which the annotation pertains in terms of the distances (such as, e.g., "two words to the left") from these two anchors (or, alternatively, in terms of the distances of the beginning and end of the highlighted sentence from a single anchor).

In some embodiments, unique element identifiers for the anchors are created from hash values of specified portions of content preceding, following, or surrounding an anchor. For example, the identifier for an anchor nested within a paragraph may be computed as the hash value of the five words preceding and the five words following the anchor location. Similarly, the identifier for an anchor sitting between two document elements may be computed from the contents or, alternatively, the identifiers of the preceding and/or following document elements. In some embodiments, the document is traversed with a sliding window of a given width (e.g., an n-gram, i.e., sequence of n words), and for each position of the window, an anchor is set (e.g., tied to the beginning of the window) and an anchor identifier computed from the content contained in the window. The window may be moved by one word at a time, resulting in a dense grid of anchors with hash values created from generally overlapping portions of content.

Tying anchor identifiers to the contents in the vicinity of the anchor by hashing the contents inherently ensures that any changes to the content result in the creation of new anchor elements with new identifiers and the omission of the old anchor elements affected by the change from the element listing of the new document version. As a consequence, annotations to outdated document portions will not be displayed with the updated document version. Conversely, annotations to content portions that have not changed, even if embedded in a document element that has changed in another portion, will be retained, at least in some embodiments. For example, in the above example of an annotation to an individual sentence highlighted within a paragraph, if another sentence within this paragraph is changed and the paragraph constitutes a single document element, the change will be reflected in omission of that document element from a document view created for the modified document, and inclusion of a new document element corresponding to the modified paragraph. The distribution of anchors may be re-created for the new document element, and if the method used for placing the anchors and generating anchor identifiers is consistent with that used for the old paragraph, at least some of the anchors previously associated with content portions that have not changed will re-occur in the new document element. For example, if an anchor is placed at the end of each sentence and its identifier computed from the hash of the sentence, only the modified sentence will get a new anchor; all other anchors will be the same as in the old paragraph. The annotation to the unmodified sentence will, in this case, inherently remain associated with that sentence in the new paragraph. As another example, if anchors are computed based on a sliding window a few words in length, and if the change to the modified sentence consists of, for instance, the addition of a few words, new anchors will be created for window positions that overlap with the new words, and all anchors for window positions that encompass only words to the left of the added words or only words to the right of the added words will re-appear.

Figure 8:
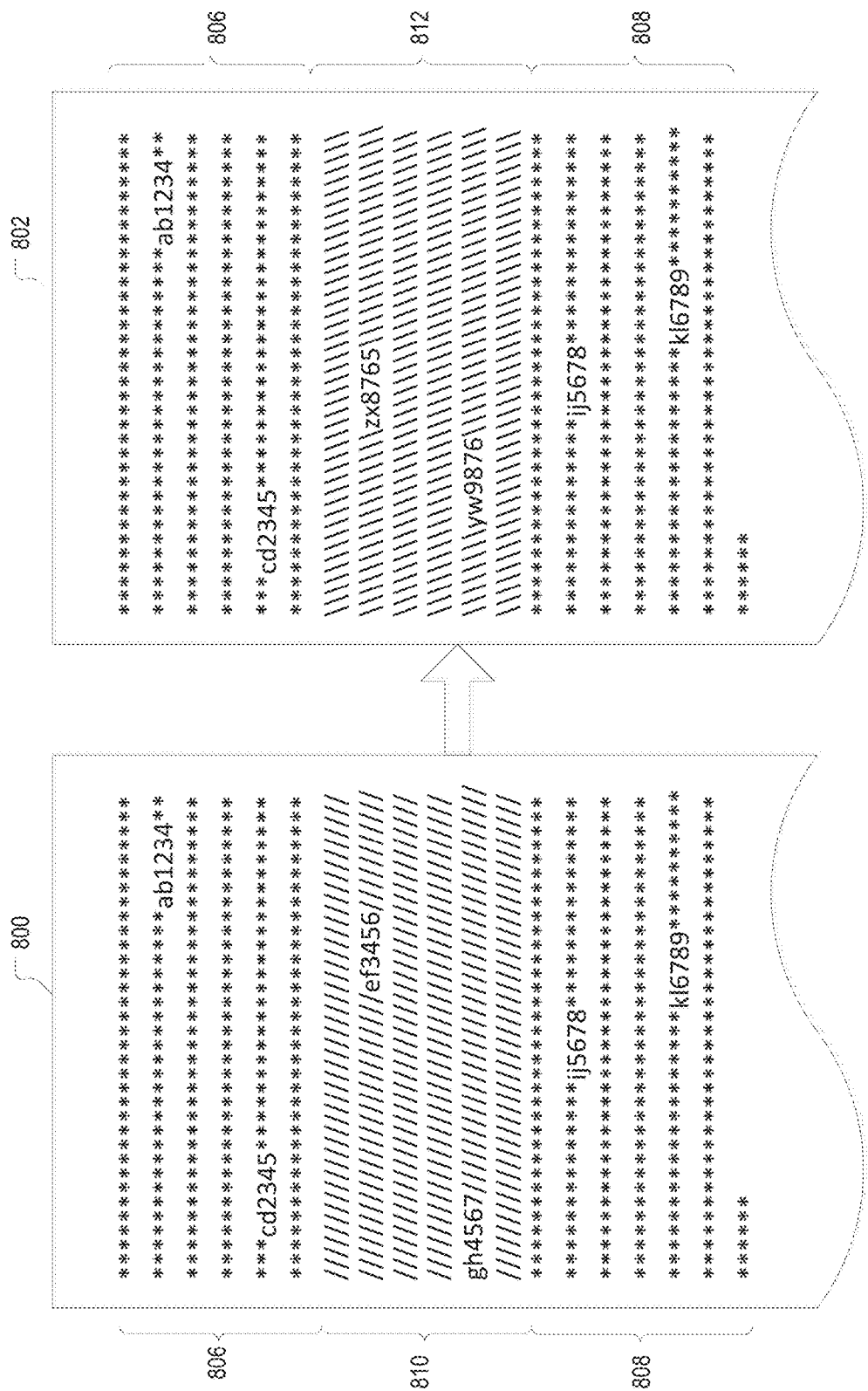
FIG. 8 is a schematic drawing of two versions of a document with embedded anchors, in accordance with various embodiments.

FIG. 8 is a schematic drawing of two versions 800, 802 of a document with embedded anchors, in accordance with various embodiments. In the drawing, the anchors are represented by example anchor identifiers (e.g., ab1234, ef3456, etc.), whereas text is symbolically represented by asterisks, forward slashes, and backslashes (the latter two indicating a text portion that has changed between the two versions 800, 802). As can be seen, the anchors in text portions 806, 808 that do not change between the first and second versions 800, 802 remain themselves unaltered. By contrast, anchors ef3456 and gh4567 embedded in a portion 810 of the first document version 802 that undergoes changes do not occur in the modified portion 812 of the second document version 804. Instead, entirely new anchors zx8765 and yw9876 are embedded in the modified text portion 812.

FIGS. 9A-9C are examples of data structures for an anchor, a document element with nested anchors, and a document view including anchors, respectively, in accordance with various embodiments.

In various embodiments, multiple sets of anchors are distributed throughout the document in accordance with multiple respective placement schemes. For example, a first, coarse set may include anchors placed at the beginning of each paragraph. A second, finer set of anchors may have anchors placed at the beginning of each sentence. A third, even finer set of anchors may be created with a sliding window run over the document, moving the window one word at a time. Anchor sets may also be created for certain types of document elements, such as figures. In addition to determining the placement of the anchors, the schemes may also specify how or based on what content identifiers for the anchors are computed. For example, for a sliding window scheme, the width of the window and the algorithm used to hash the window contents may be specified. The availability of multiple sets of anchors provides flexibility in choosing an anchor set that provides a level of resolution suitable for the particular purpose. For example, when enriching a document with links to information about people, products, materials, and the like mentioned in a document, it may be beneficial to anchor these links to the mentioning words such that, if a certain mention (e.g., of a product) is removed from the text, the link will be automatically removed as well. On the other hand, when linking comments to a document, it may be sufficient to anchor them to the larger context of a particular paragraph or at least full sentence. Multiple anchor sets may also be used simultaneously to generate (partially redundant) referencing addresses for an annotation or other item of content; this may serve to increase the confidence with which a determination to omit or retain that item of content in a new version of a document is made. To illustrate, with a single set of anchors, the decision whether to retain an annotation following a modification to the document may be a binary decision based on whether the anchor(s) associated with the annotation is or are still present in the new document. If not, the annotation will be omitted. With multiple anchor sets, a confidence level for the pertinence of the annotation may be computed on a scale between, e.g., 0 and 1, based on the proportion of anchors of the various sets that are still present in the new document.

In various embodiments, comments, questions, ratings, discussions, and other types of annotations to a publication document ("annotations" being broadly understood in this context) are stored as separate objects within the document database, optionally in a manner very similar to that in which the publications themselves are stored. For example, a comment may be broken up into document elements stored alongside the document elements of the publication, the comment as a whole being represented as a list of ordered elements in a comment document view. Further, metadata for the comment, such as its author and time of creation, may be stored separately. The document key for the various types of annotations may include an identifier of the publication to which the annotation pertains as the strong entity, as well as a weak entity identifying the particular annotation. Alternatively, for an annotation that is so substantial that it takes on a life of its own, an entirely separate document key, optionally indicating the type of document with a domain prefix, may be generated. For example, a review of a publication, though obviously related to a particular publication, may be treated like a publication in its own right and be given its own review-document key, allowing users, e.g., to post questions or comments related to the review, which would then be stored as annotations to the review and could be assigned their respective object keys that, in turn, include the review-document key as the strong entity.

Regardless whether annotations (again in the broad sense) are stored as dependent objects of a publication or as stand-alone documents, to facilitate the identification and retrieval of all annotations to a particular publication or portion thereof, the publication processing system may include a reference index 240 (shown in FIG. 2) that stores links between referenced locations within the publication document (identified, e.g., based on the document key, document path, and/or anchor(s)) and the identifier(s) (e.g., document keys) of the annotation(s) pertaining thereto. Similarly, for any citation to a portion of the publication document in another publication or other stand-alone object, the reference index may store links between the referenced location within the cited publication document and an identifier of the citing publication or object. The reference index may be bidirectional so as to also allow identifying, for a given annotation or citing document, the document portion that it references, or to perform more complex search and analysis tasks such as determining all publications on which a particular user commented. In other words, the reference index tracks all references between objects within the system and maintains their reciprocal sources and targets.

Figure 10:
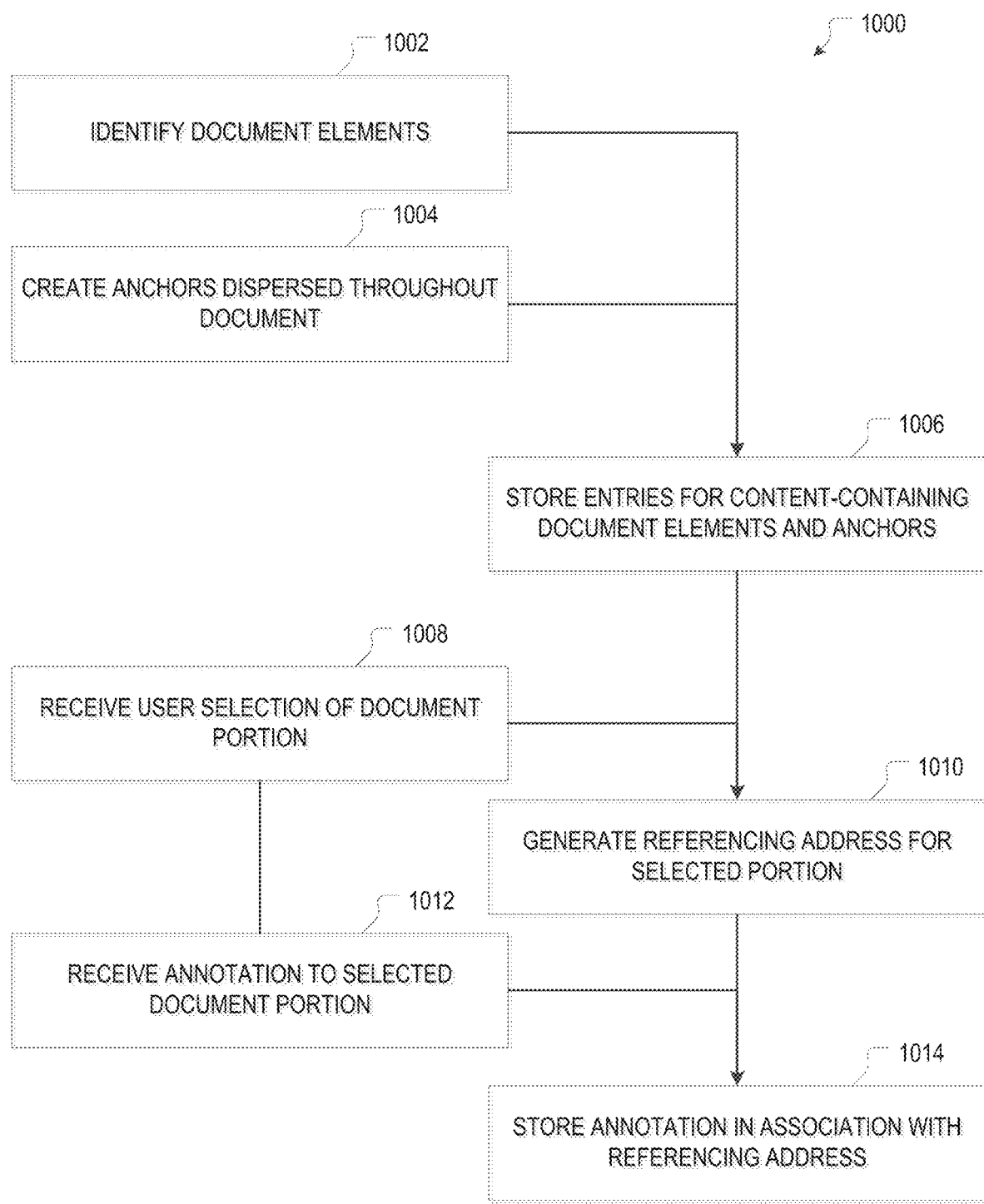
FIG. 10 is a flow chart of an example method of generating and using anchors and referencing addresses, in accordance with various embodiments.

FIG. 10 is a flow chart of an example method 1000 of generating and using anchors and referencing addresses, in accordance with various embodiments. The method 1000 involves, in response to receipt of a document, analyzing the document contents to identify the individual document elements (action 1002), e.g., as described in detail with reference to FIGS. 2 and 3. Further, the method 1000 involves creating anchors dispersed throughout the document (action 1004), e.g., by generating anchor identifiers and listing them in the document view (interspersed with and/or nested within the content-containing document elements) or within the content-containing document elements (e.g., as children). The anchors may be placed, e.g., at natural breakpoints within the document and/or its elements (e.g., at the end of paragraphs or sentences) or at regular intervals (e.g., as measured in a fixed number of words or symbols). In some embodiments, multiple sets of anchors are dispersed throughout the document in accordance with different placement schemes. For both content-containing document elements and anchors, respective document-element entries (e.g., each including a document-element identifier and one or more attributes) are stored in a database (e.g., document database 120) (action 1006).

Once a referencing grid of anchors has been generated for the document in this manner, the anchors can be used to reference portions of the document. Accordingly, in response to user selection (e.g., by way of highlighting) of a document portion as may be received, for instance, in the course of a user annotating the document (action 1008), a referencing address for the selected portion may be generated based thereon (action 1010). The referencing address may, for instance, include the document key for the document and a document path specifying a range of one or more anchors associated with the starting and end points of the selected portion. In some embodiments, multiple referencing addresses using different ones of the anchor sets are generated. Functionality for generating the referencing address may be implemented, e.g., as a special module within the publication processing system 108, such as the referencing address generator 250 depicted in FIG. 2. The annotation itself may, upon receipt (action 1012), be stored in association with the referencing address(es) (action 1014). For example, an identifier (e.g., object key) for the annotation may be stored alongside the referencing address of the portion to which the annotation pertains in a reference index 240. The process of analyzing the document and generating anchors (actions 1002, 1004, 1006) may be repeated for each new version of the document, or at least any altered portion of such new version. As explained above, this may inherently ensure that an annotation to a particular document portion identified by a referencing address using anchors is retained in subsequent document versions if, and only if, that document portion is unaltered. While FIG. 10 illustrates the use of a referencing address for a document portion to which an annotation pertains, referencing addresses may similarly be used for document portions cited in other, separate documents. The referencing address may be stored alongside an identifier (e.g., document key) of the citing document in a reference index 240. Since a modification to the cited portion will generally result in a different referencing address, the citation will point only to the originally cited portion, but not any modified version.

In the above-described method 1000, anchors are precomputed for a document to facilitate referencing of any document portion thereafter. If a document is modified frequently, the resulting frequent re-computation of anchors can consume significant processing time and resources, in particular, if multiple sets of anchors are used. Therefore, in some embodiments, anchors are distributed throughout the document at the outset, but are computed "lazily" upon demand, e.g., only once a particular document portion has been selected (e.g., for annotation purposes) and only for the selected document portion (or a slightly larger portion, to have some "padding" around the selected portion). In this case, the document view and previously stored entries for the content-containing document elements may be left untouched, and the location of the anchors within the documents may be specified only in the path attribute included with the (separate) document-element entries for the anchors. Lazy anchor creation may facilitate the computation and use of multiple anchor sets, which may otherwise be impractical due to excessive computational cost. As will be readily appreciated by one of ordinary skill in the art, the determination whether to compute anchors "eagerly" (i.e., precompute them) or lazily may depend on estimates of the number or frequency of annotations and the number or frequency of modifications made to the document, or other performance-affecting criteria.

Data Schema

Figure 11:
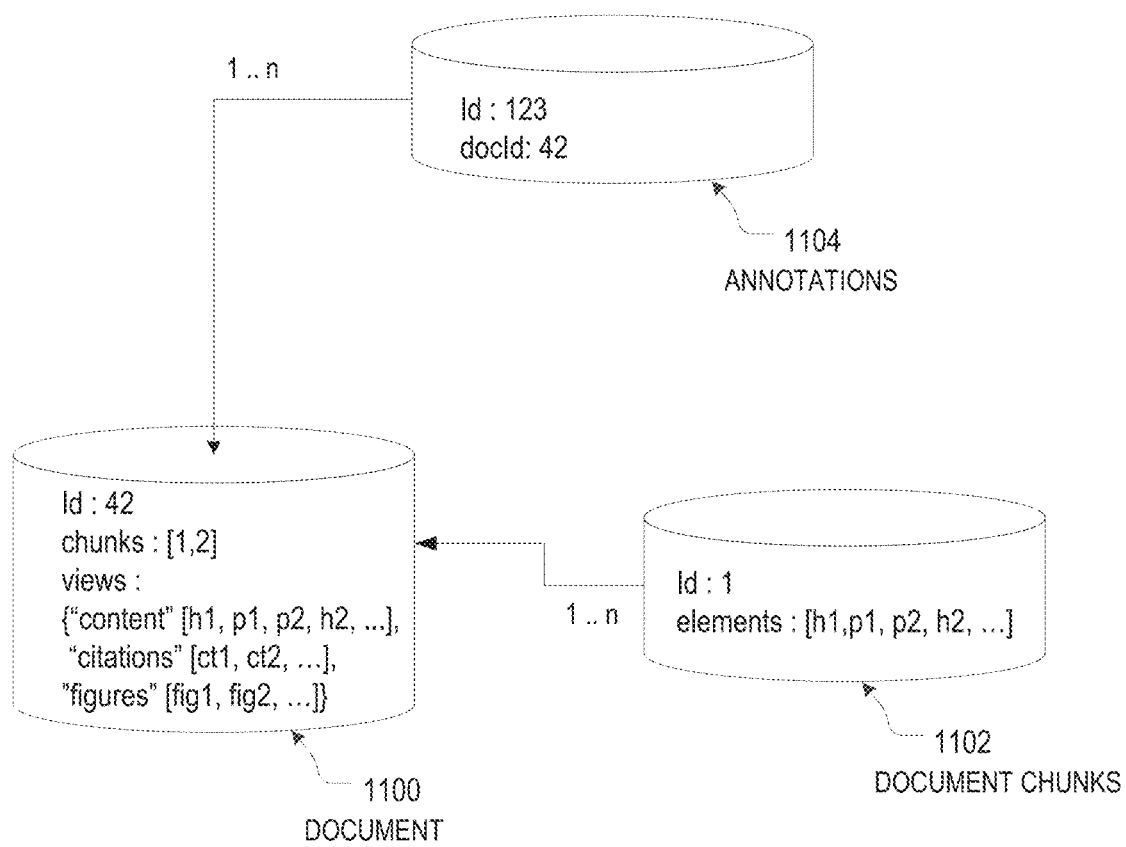
FIG. 11 is an entity relationship diagram illustrating the relationships between various data structures created and stored in accordance with various example embodiments.

FIG. 11 is an entity relationship diagram that summarizes the relationships between various data structures created and stored in accordance with some example embodiments. As shown, a document 1100 is identified by a document Id (here: 42), references one or more (here: two) chunks of document elements, and includes one or more views (here: content, citations, and figures views) each specifying a certain selection and ordering of the documents elements. The contents of the document are stored as document-element entries in the document chunks 1002, e.g., sequentially in the order in which they occur in the content view. One or more annotations 1104 to the document 1100 are stored as separate data objects, each identified by an annotation Id (here: 123) and referencing the document Id of the document to which it pertains.

Hardware and Software Implementation

Certain embodiments are described herein as including a number of logic components or modules (e.g., without limitation, the format converters 202, content parser 206, and reference grid generator 230 of publication processing system 108). Modules may constitute either software modules (e.g., code embodied on a non-transitory machine-readable medium) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein. It is to be understood that the computational functionality of the methods described herein can generally be implemented using one or more (software or hardware-implemented) modules, regardless whether a particular, named module is mentioned herein. Further, even where computational functionality is described as implemented by one or more particular named modules and/or by modules residing within particular subsystems of the social-network and publication system described herein, alternative implementations using different types of modules and/or distributing the modules differently over various sub-systems may occur to those of ordinary skill in the art. As a person of ordinary skill in the art will readily appreciate, many different ways of organizing the computational functionality into modules and distributing the modules over various sub-systems are possible.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more hardware processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below is set out a hardware (e.g., machine) architectures that may be deployed, in various example embodiments.

Figure 12:
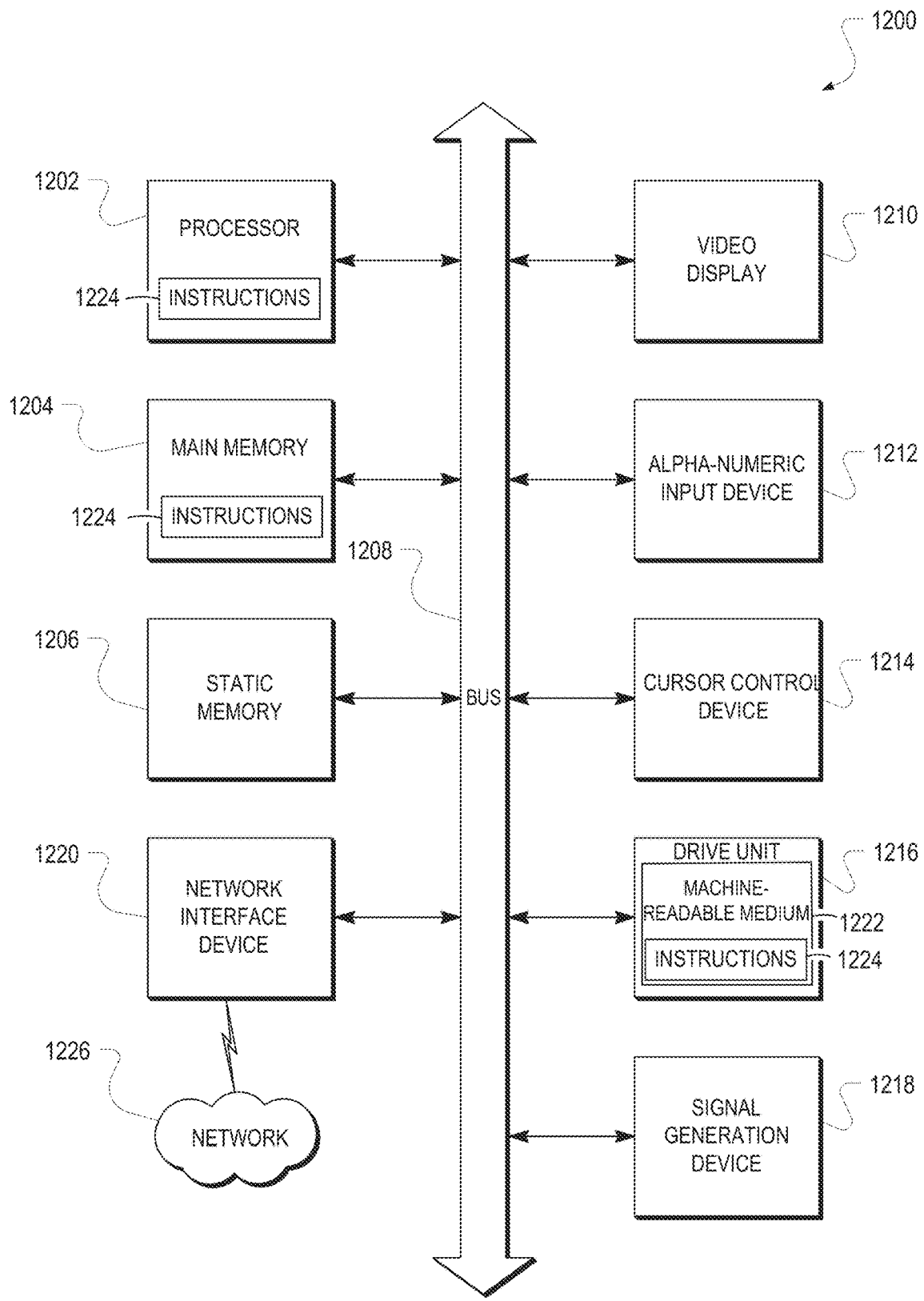
FIG. 12 is a block diagram of a machine in the example form of a computer system 1200 within which instructions for causing the machine to perform any one or more of the methodologies discussed herein may be executed.

FIG. 12 is a block diagram of a machine in the example form of a computer system 1200 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. For example, in some embodiments, each of the sub-systems 102, 108, 103, 132 of the social-network and publication system 100 is implemented by one or more machines that are connected to each other and to the machines of the other sub-systems via a network.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker) and a network interface device 1220.

The disk drive unit 1216 includes a machine-readable medium 1222 storing one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The following numbered examples are illustrative embodiments.

1. A method comprising: at a publication server, receiving a document in an external format and converting the document to an internal format, the converting comprising analyzing contents of the document to identify, based on a plurality of document-element types associated with the internal format, a plurality of document elements collectively constituting the contents of the document; and storing, in one or more databases, an entry for each of the identified document elements and one or more views for the document, each view comprising an ordered list of document elements selected from the identified document elements.

2. The method of example 1, wherein converting the document to an internal format further comprises converting the external format to an intermediate format in a mark-up language, and wherein the document elements are identified by parsing the document in the intermediate format.

3. The method of example 2, wherein converting the document to an internal format further comprises selecting, among a plurality of format converters associated with different external formats, a format converter associated with an external format of the received document.

4. The method of any of the preceding examples, further comprising storing binary files associated with the identified document elements in a file repository.

5. The method of any of the preceding examples, further comprising extracting metadata from the document when analyzing the contents of the document, and storing the extracted metadata in a database of metadata.

6. The method of any of the preceding examples, further comprising extracting metadata from the document when analyzing the contents of the document, and, upon detection of matching metadata in a database of metadata, associating the one or more views with the detected matching metadata.

7. The method of any of the preceding examples, wherein analyzing the contents of the document comprises applying handlers specific to a plurality of respective document-element types.

8. The method of any of the preceding examples, wherein a plurality of views are stored for the document, the views differing in the respective selections of document elements, the method further comprising, in response to user selection of one of the plurality of views, creating a user interface screen comprising the document elements listed in the selected view.

9. The method of any of the preceding examples, further comprising linking at least one of the document elements with content stored externally to the document.

10. The method of example 9, wherein the externally stored content comprises at least one of a publication cited in the document, information about an author of the document, or data related to a product or machinery used, chemical compound, material, DNA sequence, clinical trial, or funding source referenced in the document.

11. A system comprising: one or more processor-implemented modules comprising: a content parser configured to convert a received external document to an internal format by analyzing contents of the document to identify, based on a plurality of document-element types associated with the internal format, a plurality of document elements collectively constituting the contents of the document, and cause an entry for each of the identified document elements and one or more views for the document to be stored in one or more databases, each view comprising an ordered list of document elements selected from the identified document elements.

12. The system of example 11, wherein the modules further comprise: at least one format converter for converting the external format to an intermediate format in a mark-up language, and wherein the content parser is configured to identify the document elements by parsing the document in the intermediate format.

13. The system of example 12, wherein the at least one format converter comprises a plurality of format converters associated with different external formats.

14. The system of any of examples 11-13, wherein the content parser is further configured to cause binary files associated with the identified document elements to be stored in a file repository.

15. The system of any of examples 11-14, wherein the content parser is further configured to extract metadata from the document when analyzing the contents of the document, and to cause the extracted metadata to be stored in a database of metadata.

16. The system of any of examples 11-15, wherein the content parser is further configured to extract metadata from the document when analyzing the contents of the document, and, upon detection of matching metadata in a database of metadata, associate the one or more views with the detected matching metadata.

17. The system of any of examples 11-16, wherein the content parser comprises a plurality of handlers specific to a plurality of respective document-element types.

18. The system of any of examples 11-17, wherein a plurality of views are stored for the document, the views differing in the respective selections of document elements, the modules further comprising: a user-interface module configured to create, in response to user selection of one of the plurality of views, a user interface screen comprising the document elements listed in the selected view.

19. The system of any of examples 11-17, wherein the content parser is further configured to link at least one of the document elements with content stored externally to the document.

20. The system of example 19, wherein the externally stored content comprises at least one of a publication cited in the document, information about an author of the document, or data related to a product or machinery used, chemical compound, material, DNA sequence, clinical trial, or funding source referenced in the document.

21. A non-transitory machine-readable medium storing instructions that, when executed by one or more hardware processors, cause the one or more hardware processors to: convert a received external document to an internal format by analyzing contents of the document to identify, based on a plurality of document-element types associated with the internal format, a plurality of document elements collectively constituting the contents of the document; and cause an entry for each of the identified document elements and one or more views for the document to be stored in one or more databases, each view comprising an ordered list of document elements selected from the identified document elements.

22. A method comprising: storing, for each of one or more documents, (i) database entries for a plurality of respective document elements collectively constituting contents of the document, and (ii) at least one document view each comprising an ordered list of at least some of the document elements; and, at a server, receiving a user request for one of the one or more documents, the request specifying one or more display criteria, and responsive to the request, selectively causing at least some of the document elements of the requested document to be displayed in accordance with the one or more display criteria.

23. The method of example 22, wherein multiple document views comprising multiple respective selections of document elements are stored for the requested document, and wherein selectively causing at least some of the document elements of the requested document to be displayed comprises selecting one of the document views for display based on the display criteria.

24. The method of example 22, wherein selectively causing at least some of the document elements of the requested document to be displayed comprises filtering the document elements that collectively constitute the contents of the requested document based on the display criteria.

25. The method of example 24, wherein the database entry for each document element comprises at least one document-element attribute, the filtering being based on the document-element attributes of the document elements of the requested document.

26. The method of example 24, wherein the filtering is based on a document path selection specifying a selected portion of the requested document.

27. The method of example 24, wherein the filtering is based on an index referencing document elements.

28. The method of any of examples 22-27, wherein the one or more display criteria specify a selection of document elements to be displayed to the exclusion of others.

29. The method of any of examples 22-28, wherein the one or more display criteria specify a selection of documents elements to be displayed before others.

30. The method of any of examples 22-30, wherein the one or more display criteria specify a selection of document elements to be highlighted.

31. The method of any of examples 22-31, further comprising selectively displaying contents related to the requested document based on the display criteria.

32. The method of any of examples 22-32, further comprising storing each document in chunks collectively constituting the document, each chunk consecutively storing an ordered subset of the database entries for the document elements of the document, a size of the chunks being selected based on performance criteria associated with displaying the document.

33. The method of example 32, wherein the database entries for the document elements of one or more most frequently requested pre-computed views are each stored in a single chunk.

34. A system comprising: one or more databases storing, for each of one or more documents, (i) database entries for a plurality of respective document elements collectively constituting contents of the document, and (ii) at least one document view each comprising an ordered list of at least some of the document elements; and a processor-implemented display customization module configured to: receive a user request for one of the one or more documents, the request specifying one or more display criteria; and responsive to the request, selectively causing at least some of the document elements of the requested document to be displayed in accordance with the one or more display criteria.

35. The system of example 34, wherein multiple document views comprising multiple respective selections of document elements are stored for the requested document, and wherein the display customization module is configured to cause one of the document views to be selected for display based on the display criteria.

36. The system of example 34, wherein the display customization module comprises one or more filters for filtering the document elements that collectively constitute the contents of the requested document based on the display criteria.

37. The system of example 36, wherein the database entry for each document element comprises at least one document-element attribute and the one or more filters comprise a filter configured to filter based on the document-element attributes of the document elements of the requested document.

38. The system of example 36, wherein the one or more filters comprise a filter configured to filter based on a document path selection specifying a selected portion of the requested document.

39. The system of example 36, wherein the one or more filters comprise a filter configured to filter based on an index referencing document elements.

40. The system of any of examples 34-39, wherein the display customization module is further configured to cause contents related to the requested document to be displayed selectively based on the display criteria.

41. The system of any of examples 34-40, wherein the one or more display criteria specify a selection of document elements to be displayed to the exclusion of others.

42. The system of any of examples 34-41, wherein the one or more display criteria specify a selection of documents elements to be displayed before others.

43. The system of any of examples 34-42, wherein the one or more display criteria specify a selection of document elements to be highlighted.

44. The system of any of examples 34-43, wherein each document is stored in chunks collectively constituting the document, each chunk consecutively storing an ordered subset of the database entries for the document elements of the document, a size of the chunks being selected based on performance criteria associated with displaying the document.

45. The system of example 44, wherein the database entries for the document elements of one or more most frequently requested pre-computed views are each stored in a single chunk.

46. A non-transitory machine-readable medium storing instructions that, when executed by one or more hardware processors, cause the one or more hardware processors to: receive a user request for one of one or more documents each being stored in a database as database entries for a plurality of respective document elements collectively constituting contents of the document in conjunction with one or more document views each comprising an ordered list of at least some of the document elements, the request specifying one or more display criteria; and, responsive to the request, selectively cause at least some of the document elements of the requested document to be displayed in accordance with the one or more display criteria.

47. A method comprising: at a publication server, receiving a document; analyzing contents of the document to identify a plurality of document elements that collectively constitute the contents of the document, and storing entries for the document elements in a database; creating a first document view representing the document as a list of the plurality of document elements; associating a first version identifier with the first document view; receiving an update to the document; analyzing the update to identify one or more document-element omissions or additions that collectively constitute the update, and, responsive to identifying any one or more added document elements, storing entries for the added document elements in the database; creating a second document view representing the document as modified by the received update as an updated list of document elements, the updated list including all added document elements, if any, and not including any omitted document elements; and associating a second version identifier with the second document view.

48. The method of example 47, wherein the first and second version identifiers are based on hashes of document-element identifiers associated with the document elements listed in the first and second document views, respectively.

49. The method of example 47 or example 48, further comprising receiving an annotation to the document, the annotation being associated with one or more document elements listed for the first document view, but not the second document view.

50. The method of example 49, further comprising, in response to user selection of one of the first or second views, creating a user interface screen comprising the document elements listed in the selected view and comprising the annotation only in response to selection of the first view.

51. The method of any of examples 47-50, further comprising associating time stamps with the first and second versions.

52. The method of any of examples 47-51, further comprising receiving further updates to the document; repeating the analyzing, creating, and associating actions for each of the further updates; and generating a history of the document based on the first document view and the document views created for the respective updates.

53. The method of any of examples 47-52, wherein analyzing the update comprises analyzing the updated document to identify document elements that collectively constitute the contents of the updated document, and comparing the identified document elements against the document elements listed in the first document view.

54. A system comprising: one or more databases storing, for each of one or more documents, (i) database entries for a plurality of respective document elements collectively constituting contents of the document, and (ii) a document view comprising an ordered list of the document elements, the document view having an associated version identifier; and one or more processor-implemented modules configured to analyze an update to the document to identify one or more document-element omissions or additions that collectively constitute the update, and, responsive to identifying any one or more added document elements, store entries for the added document elements in the database, create a second document view representing the document as modified by the received update as an updated list of document elements, the updated list including any added document elements and not including any omitted document elements, and associate a second version identifier with the second document view.

55. The system of example 54, wherein the one or more processor-implemented modules are configured to compute the first and second version identifiers based on hashes of document-element identifiers associated with the document elements listed in the first and second document views, respectively.

56. The system of example 54 or 55, wherein the one or more processor-implemented modules are further configured to receive an annotation to one or more document elements listed for the first document view, but not the second document view.

57. The system of example 57, wherein the one or more processor-implemented modules are further configured create, in response to user selection of one of the first or second views, a user interface screen comprising the document elements listed in the selected view and comprising the annotation only in response to selection of the first view.

58. The system of any of examples 54-57, wherein the one or more processor-implemented modules are further configured to associate time stamps with the first and second versions.

59. The system of any of examples 54-58, wherein the one or more processor-implemented modules are further configured to generate a history of the document based on the first document view and a plurality of document views created for a plurality of respective updates to the document.

60. The system of any of examples 54-59, wherein the one or more processor-implemented modules are configured to analyze the update by analyzing the updated document to identify document elements that collectively constitute the contents of the updated document, and comparing the identified document elements against the document elements listed in the first document view.

61. A non-transitory machine-readable medium storing instructions that, when executed by one or more hardware processors, cause the one or more hardware processors to: in response to receipt of a document, analyze contents of a document to identify a plurality of document elements that collectively constitute the contents of the document, and store entries for the document elements in a database, create a first document view representing the document as a list of the plurality of document elements; and associate a first version identifier with the first document view; and, in response to receipt of an update to the document, analyze the update to identify one or more document-element omissions or additions that collectively constitute the update, and, responsive to identifying any one or more added document elements, store entries for the added document elements in the database, create a second document view representing the document as modified by the received update as an updated list of document elements, the updated list including all added document elements, if any, and not including any omitted document elements, and associate a second version identifier with the second document view.

62. A method comprising: analyzing contents of a document to identify a plurality of document elements that collectively constitute the contents of the document; creating a plurality of anchors dispersed throughout the document, each anchor being a document element without content; storing a database entry for each of the identified document elements and each of the anchors, each of the database entries comprising a unique document-element identifier; and, in response to selection of a portion of the document, generating a referencing address uniquely identifying the selected portion, the referencing address comprising at least one or more document-element identifiers of one or more respective anchors associated with the selected portion.

63. The method of example 62, wherein the plurality of anchors are created using a sliding window applied to the document.

64. The method of example 62, wherein the plurality of anchors are created at natural breakpoints of the document.

65. The method of any of examples 62-64, wherein at least one of the anchors is created between successive ones of the identified document elements.

66. The method of any of examples 62-65, wherein at least one of the anchors is nested within one of the identified document elements.

67. The method of any of examples 62-66, wherein unique document-element identifiers for the anchors are created from hash values of specified portions of content preceding, following, or surrounding an anchor.

68. The method of any of examples 62-67, further comprising generating a document key uniquely identifying the document among a plurality of documents, the referencing address further comprising the document key.

69. The method of example 68, wherein the document key further uniquely identifies a version of the document among a plurality of versions.

70. The method of any of examples 62-69, wherein the selected portion of the document is cited in another document, the method further comprising storing the referencing address of the selected portion of the document along with a unique identifier of the citing document in a reference index.

71. The method of any of examples 62-70, further comprising receiving an annotation pertaining to the selected portion, and storing the referencing address of the selected portion and a unique identifier of the annotation in a reference index.

72. The method of any of examples 62-71, comprising creating multiple sets of anchors dispersed throughout the document in accordance with multiple respective anchor-placement schemes.

73. The method of example 73, comprising using the multiple sets of anchors to generate multiple referencing addresses identifying the selected portion.

74. A system comprising: one or more processor-implemented modules comprising: a reference grid generator configured to create a plurality of anchors dispersed throughout a document, each anchor being a document element without content; a content parser configured to analyze contents of the document to identify a plurality of content-containing document elements that collectively constitute the contents of the document, and to cause database entries to be stored for each of the identified document elements and each of the anchors, each of the database entries comprising a unique document-element identifier; and a referencing address generator configured to generate, in response to selection of a portion of the document, a referencing address uniquely identifying the selected portion, the referencing address comprising at least one or more document-element identifiers of one or more respective anchors associated with the selected portion.

75. The system of example 74, further comprising the database storing the entries for the content-containing document elements and the anchors.

76. The system of example 74 or example 75, wherein the reference grid generator is configured to place the plurality of anchors by applying a sliding window to the document.

77. The system of example 74 or example 75, wherein the reference grid generator is configured to place the plurality of anchors at natural breakpoints of the document.

78. The system of any of examples 74-77, wherein the reference grid generator is configured to create anchors between at least some successive pairs of the identified document elements.

79. The system of any of examples 74-78, wherein the reference grid generator is configured to create anchors within at least one of the identified document elements.

80. The system of any of examples 74-79, wherein the reference grid generator is configured to create unique document-element identifiers for the anchors from hash values of specified portions of content preceding, following, or surrounding an anchor.

81. The system of any of examples 74-80, wherein the referencing address generator is configured to further include a document key uniquely identifying the document in the referencing address.

82. The system of any of examples 74-81, further comprising a referencing index storing the referencing address of the selected portion of the document along with a unique identifier of a document citing the selected portion or an annotation pertaining to the selected portion.

83. The system of any of examples 74-82, wherein the reference grid generator is configured to create multiple sets of anchors dispersed throughout the document in accordance with multiple respective anchor-placement schemes.

84. The system of example 83, wherein the referencing address generator is configured to use the multiple sets of anchors to generate multiple referencing addresses identifying the selected portion.

85. A non-transitory machine-readable medium storing instructions that, when executed by one or more hardware processors, cause the one or more hardware processors to: analyze contents of a document to identify a plurality of document elements that collectively constitute the contents of the document; create a plurality of anchors dispersed throughout the document, each anchor being a document element without content; store a database entry for each of the identified document elements and each of the anchors, each of the database entries comprising a unique document-element identifier; and in response to selection of a portion of the document, generate a referencing address uniquely identifying the selected portion, the referencing address comprising at least one or more document-element identifiers of one or more respective anchors associated with the selected portion.

Although the invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   for a document dissected into a plurality of constituent document elements, storing document-element entries for all of the document elements in one or more computer-readable media, each document-element entry comprising a document-element attribute containing a content or reference to the content of the respective document element and a document-element attribute specifying a document-element type;
   receiving at a server, from a user, a request for the document and a content selection specifying first and second document-element types, the first document-element type being different from the second document-element type; and
   by one or more hardware processors of the server, responsive to the request, assembling, from the document-element entries, first and second views of the document for simultaneous display in respective first and second portions of a user interface, the first view comprising the contents of document elements of the first document-element type and the second document view comprising the contents of document elements of the second document-element type.

2. The method of claim 1, wherein assembling the first and second views comprises retrieving the document-element entries for the document and filtering the document-element entries based on the attributes specifying the document-element types.

3. The method of claim 1, wherein each document element further comprises a unique document-element identifier, the method further comprising storing a plurality of pre-computed document-view data structures each comprising an ordered list of document-element identifiers of at least a subset of the document elements, the document-view data structures differing from each other in the document-element types of the document elements listed therein, and wherein assembling the first and second views comprises retrieving first and second document-view data structures pre-computed for document elements of the first and second types, and assembling the first and second views from the document-element entries listed in the first and second document-view data structures.

4. The method of claim 1, wherein the document elements of the first type are text elements and the document elements of the second type are figures or citations.

5. The method of claim 1, wherein the first and second portions of the user interface are independently navigable.

6. The method of claim 1, wherein the first and second portions of the user interface are interlocked such that, upon user navigation through the second portion to bring a document element of the second type into view, the first portion of the user interface automatically adjusts to show a document element of the first document-element type that references the document element of the second document-element type brought into view.

7. The method of claim 1, wherein, upon selection of a document element of the second document-element type in the second portion of the user interface, document elements of the first document-element type that reference the selected document element of the second document-element type are highlighted in the first portion of the user interface.

8. The method of claim 7, wherein each document-element further comprises a unique document-element identifier, and wherein the document elements of the first document-element type that reference the selected document element of the second document-element type are identified based on document-element attributes, in the document-element entries for the document elements of the first document-element type, including a document-element identifier of the selected document element of the second document-element type.

9. The method of claim 7, wherein each document-element further comprises a unique document-element identifier, and wherein the document elements of the first document-element type that reference the selected document element of the second document-element type are identified based on an index associating document elements of the second type with document-element identifiers of the document elements referencing them.

10. The method of claim 1, wherein each document element further comprises a unique document-element identifier, the method further comprising storing at least one ordered list of document-element identifiers specifying an order of the document elements within the document, wherein the contents of the document elements of the first type are ordered in the first view in accordance with the at least one ordered list and the document elements of the second type are ordered in the second view in accordance with the at least one ordered list.

11. A system comprising:
    one or more computer-readable media storing, for a document dissected into a plurality of constituent document elements, document-element entries for all of the document elements, each document-element entry comprising a document-element attribute containing a content or reference to the content of the respective document element and a document-element attribute specifying a document-element type; and
    one or more computer processors executing instructions to perform operations comprising:
    in response to receipt, from a user, of a request for the document and a content selection specifying first and second document-element types, the first document-element type being different from the second document-element type, assembling, from the document-element entries, first and second views of the document for simultaneous display in respective first and second portions of a user interface, the first view comprising the contents of document elements of the first document-element type and the second document view comprising the contents of document elements of the second document-element type.

12. The system of claim 11, wherein assembling the first and second views comprises retrieving the document-element entries for the document and filtering the document-element entries based on the attributes specifying the document-element types.

13. The system of claim 11, wherein each document-element further comprises a unique document-element identifier, the one or more computer-readable media further storing a plurality of pre-computed document-view data structures each comprising an ordered list of document-element identifiers of at least a subset of the document elements, the document-view data structures differing from each other in the document-element types of the document elements listed therein, and wherein assembling the first and second views comprises retrieving first and second document-view data structures pre-computed for document elements of the first and second types, and assembling the first and second views from the document-element entries listed in the first and second document-view data structures.

14. The system of claim 11, wherein the document elements of the first type are text elements and the document elements of the second type are figures or citations.

15. The system of claim 11, wherein the first and second portions of the user interface are independently navigable.

16. The system of claim 11, wherein the first and second portions of the user interface are interlocked such that, upon user navigation through the second portion to bring a document element of the second document-element type into view, the first portion of the user interface automatically adjusts to show a document element of the first document-element type that references the document element of the second document-element type brought into view.

17. The system of claim 16, wherein, upon selection of a document element of the second document-element type in the second portion of the user interface, document elements of the first document-element type that reference the selected document element of the second document-element type are highlighted in the first portion of the user interface.

18. The system of claim 17, wherein each document element further comprises a unique document-element identifier, and wherein the document elements of the first document-element type that reference the selected document element of the second document-element type are identified based on document-element attributes, in the document-element entries for the document elements of the first document-element type, including a document-element identifier of the selected document element of the second document-element type.

19. The system of claim 17, wherein each document-element further comprises a unique document-element identifier, and wherein the document elements of the first document-element type that reference the selected document element of the second document-element type are identified based on an index associating document elements of the second type with document-element identifiers of the document elements referencing them.

20. One or more machine-readable media storing instructions which, when executed by one or more processors of a machine, cause the one or more processors to perform operations for generating a user interface displaying a document, the operations comprising:
  in response to receipt, from a user, of a request for the document and a content selection specifying first and second document-element types, the first document-element type being different from the second document-element type:
  retrieving, from data storage, document-element entries stored for a plurality of constituent document elements of the document, each document-element entry comprising a document-element attribute containing a content or reference to the content of the respective document element and a document-element attribute specifying a document-element type; and
  assembling, from the document-element entries, first and second views of the document for simultaneous display in respective first and second portions of the user interface, the first view comprising the contents of document elements of the first document-element type and the second document view comprising the contents of document elements of the second document-element type.

* * * * *